US012490739B2

(12) United States Patent
De Saegher et al.

(10) Patent No.: US 12,490,739 B2
(45) Date of Patent: Dec. 9, 2025

(54) SYNERGISTICALLY EFFECTIVE FUNGICIDE COMPOSITION COMPRISING CHOLINE PHOSPHONATE AND AT LEAST ONE ADDITIONAL FUNGICIDE

(71) Applicant: BELCHIM CROP PROTECTION NV, Londerzeel (BE)

(72) Inventors: Johan De Saegher, Londerzeel (BE); Paul Ruelens, Londerzeel (BE); Patrice Cauchy, Londerzeel (BE)

(73) Assignee: BELCHIM CROP PROTECTION NV, Londerzeel (BE)

( * ) Notice: Subject to any disclaimer, the term of this patent is extended or adjusted under 35 U.S.C. 154(b) by 685 days.

(21) Appl. No.: 17/617,788

(22) PCT Filed: Jun. 12, 2020

(86) PCT No.: PCT/EP2020/066310
§ 371 (c)(1),
(2) Date: Dec. 9, 2021

(87) PCT Pub. No.: WO2020/249733
PCT Pub. Date: Dec. 17, 2020

(65) Prior Publication Data
US 2022/0225613 A1 Jul. 21, 2022

(30) Foreign Application Priority Data
Jun. 14, 2019 (EP) .................................... 19180366

(51) Int. Cl.
*A01N 33/12* (2006.01)
*A01N 43/40* (2006.01)
*A01N 47/12* (2006.01)
*A01N 59/02* (2006.01)
*A01N 59/26* (2006.01)
*A01P 3/00* (2006.01)

(52) U.S. Cl.
CPC ............. *A01N 33/12* (2013.01); *A01N 43/40* (2013.01); *A01N 47/12* (2013.01); *A01N 59/02* (2013.01); *A01N 59/26* (2013.01); *A01P 3/00* (2021.08)

(58) Field of Classification Search
CPC ........ A01N 33/12; A01N 47/12; A01N 59/02; A01N 59/26; A01P 3/00
See application file for complete search history.

(56) References Cited

U.S. PATENT DOCUMENTS

| 6,656,249 | B1 | 12/2003 | Buisman et al. |
| 2011/0281807 | A1* | 11/2011 | Ohara ................... A01N 43/16 514/23 |
| 2017/0035046 | A1* | 2/2017 | Goyal .................... A01N 57/20 |
| 2017/0208808 | A1* | 7/2017 | Lamberth .............. A01N 43/54 |

FOREIGN PATENT DOCUMENTS

| EP | 2601839 A1 | 6/2013 |
| WO | 2007/071428 A2 | 6/2007 |
| WO | 2012/110439 A1 | 8/2012 |
| WO | 2020/249733 A1 | 12/2020 |

OTHER PUBLICATIONS

ISR-WO dated Jul. 20, 2020 for parent application PCT/EP2020/066310.

* cited by examiner

*Primary Examiner* — Zohreh A Fay
(74) *Attorney, Agent, or Firm* — Vorys, Sater, Seymour and Pease, LLP

(57) ABSTRACT

The current invention concerns a synergistically effective fungicide composition comprising as component (A) a fungicidally active amount of choline phosphonate and as component (B) at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols, wherein a weight ratio of components (A) and (B) is in a range from 1:1000 to 1000:1.
The invention further concerns a kit a use of a fungicide composition according to the invention in an amount effective for controlling one or more types of fungal infections by applying the fungicide composition to the fungal infections.

16 Claims, No Drawings

SYNERGISTICALLY EFFECTIVE FUNGICIDE COMPOSITION COMPRISING CHOLINE PHOSPHONATE AND AT LEAST ONE ADDITIONAL FUNGICIDE

TECHNICAL FIELD

The invention relates to a synergistically effective fungicide composition comprising choline phosphonate and at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols, to a kit comprising choline phosphonate and at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols, and to a use of a fungicide composition according to the invention for controlling one or more types of fungal infections.

BACKGROUND

In crop protection, it is in principle desirable to increase the specific action of a fungicidally active substance and the safety of operation. The fungicidal activity of many fungicides against fungal infections is already on a high level, but generally depends on the application rate, the respective preparation form, the respective fungal infection to be controlled or the spectrum of fungal infections, the climatic and soil conditions, etc. Thus, there is frequently a need for targeted synergistic activity against specific types of fungal infections, control of fungal infections with better overall selectivity, generally lower amounts of active compounds used for equally good control results and for a reduced active compound input into the environment to avoid, for example, leaching and carry-over effects. However, in the combined use of a plurality of active compounds, there are frequently phenomena of chemical, physical or biological incompatibility, for example decomposition of an active compound or antagonism in the biological activity of the active compounds.

The present invention aims to resolve at least some of the problems mentioned above. It is furthermore an object of the present invention to provide fungicide compositions as alternatives to the prior art, or as an improvement thereof.

SUMMARY OF THE INVENTION

A first aspect of the present invention relates to a synergistically effective fungicide composition according to claim 1.

In the fungicide composition according to the first aspect of the present invention, choline phosphonate has shown an unexpected increase in fungicidal activity when combined with at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols. This increase in fungicidal activity is caused by a synergistic effect when combining choline phosphonate and at least one said additional fungicide according to a weight ratio according to the first aspect of the present invention.

A second aspect of the present invention relates to a kit according to claim 13.

A third aspect of the present invention relates to a use according to claim 15.

DETAILED DESCRIPTION OF THE INVENTION

The recitation of numerical ranges by one or two endpoints includes all numbers and fractions subsumed within that range, as well as the recited one or two endpoints.

The term "fungal infection", as used herein, refers to an infection of a plant substrate, and even more preferably of a crop, by a phytopathogenic fungus causing plant disease. Fungal infection of crops is a significant agricultural problem, causing pronounced loss of crop quality and usability. Preferably, fungicide compositions according to the invention are used for preventing growth of phytopathogenic fungi and/or for controlling, more preferably for eliminating, on or more phytopathogenic fungi on crops. By specifically inhibiting or killing phytopathogenic fungi, fungal disease caused by hytopathogenic fungi is controlled.

The term "phosphonate", as used herein, is to be understood as a salt of phosphorous acid, $H_3PO_3$. "Phosphite" is herein used as a synonym of "phosphonate". Phosphonates are fungicide active compounds and belong to the Group 33 of the Fungicide Resistance Action Committee. The mode of action of phosphonates is both indirect and direct, and involves the induction of host plant resistance and the inhibition of oxidative phosphorylation. Phosphonates are known as environmental benign fungicides with a low toxicity towards users and consumers. Next to being fungicide active compounds, phosphonates can be used as fertilizers in agriculture.

The term "choline", as used herein, is a chemical compound with molecular formula $C_5H_{14}NO^+$ and is also called (2-Hydroxyethyl)trimethylammonium. Choline is an ubiquitous substance in nature, known for being a biostimulating compound for plants as described in TG. Mason, G. Blunden (1989) Bot. Mar. 3_2 313-316. Choline is an example of a quaternary salt. Quaternary salts are compounds known for being soluble in both hydrophilic and lyophilic environments. Choline, moreover, in the interior of plants, is easily oxidized to glycine betaine. In the agronomical field, when administered, for example, to fruit plants, glycine betaine contributes to controlling abiotic and nutritional growth stress, reducing imperfections in fruit rinds and the tendency of the rind to break during ripening, as described in EP-A-0806897, by acting as an osmolyte regulator. Choline has shown to have an unexpected activity as fungicidal and bactericidal product in the agronomical field, and shows a prolonged protective action on vegetables with respect to phytopathogen fungi and bacteria.

The term "choline phosphonate" as used herein and "fosamine-choline" are synonyms.

The term "safener", as used in this text, is to be understood as a compound or a mixture of compounds which compensates for, or reduces, the phytotoxic properties of a fungicide towards useful plants without substantially reducing the fungicidal action against fungal infections.

The fungicidal activity of fungicides comprising phosphonates against fungal infections is already on a high level, but generally depends on the application rate, the respective preparation form, the respective fungal infection to be controlled or the spectrum of fungal infections, the climatic and soil conditions, etc. Further criteria in this context are duration of action, or the breakdown rate, of the fungicide, the general crop plant compatibility and speed of action (more rapid onset of action), the activity spectrum and behavior toward follower crops (replanting problems) or the general flexibility of application (control of fungal infections in their various infection stages). If appropriate, changes in the susceptibility of fungal infections, which may occur on prolonged use of the fungicides or in limited geographical regions (control of tolerant or resistant fungal infections), may also have to be taken into account. The compensation of losses in action in the case of fungal infections by increasing the application rates of the fungicides is only possible to a certain degree, for example because such a procedure reduces the selectivity of the fungicides or because the action is not improved, even when applying higher rates.

Thus, there is frequently a need for targeted synergistic activity against specific types of fungal infections, control of fungal infections with better overall selectivity, generally lower amounts of active compounds used for equally good control results and for a reduced active compound input into the environment to avoid, for example, leaching and carry-over effects. There is also a need for control of fungal infections which were as yet uncontrolled (gaps) and for control of fungal infections which are tolerant or resistant to individual fungicides or to a number of fungicides. There is also a need for developing one-shot applications to avoid labor-intensive multiple applications, and also to develop systems for controlling the rate of action, where, in addition to an initial rapid control of fungal infections, there is also a slow, curative control.

A possible solution to the problems mentioned above may be to provide combined fungicide compositions, that is combinations of a plurality of fungicides and/or other components from the group of the agrochemically active compounds of a different type and of formulation auxiliaries and additives customary in crop protection which contribute the desired additional properties. However, in the combined use of a plurality of active compounds, there are frequently phenomena of chemical, physical or biological incompatibility, for example decomposition of an active compound or antagonism in the biological activity of the active compounds. For these reasons, potentially suitable combinations of active compounds have to be selected in a targeted manner and tested experimentally for their suitability, it not being possible to safely discount a priori negative or positive results.

A first aspect of the present invention provides a synergistically effective fungicide composition comprising as component (A) a fungicidally active amount of choline phosphonate and as component (B) at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols, wherein a weight ratio of components (A) and (B) is in a range from 1:1000 to 1000:1, more preferably from 1:900 to 900:1, more preferably from 1:800 to 800:1, more preferably from 1:700 to 700:1, more preferably from 1:600 to 600:1, more preferably from 1:500 to 500:1, even more preferably from 1:400 to 400:1, even more preferably from 1:300 to 300:1, even more preferably from 1:200 to 200:1, even more preferably from 1:180 to 180:1, and even more preferably from 1:160 to 160:1. In a most preferred embodiment, said weight ratio of components (A) and (B) is in a range from 1:150 to 150:1, more preferably from 1:130 to 140:1, and even more preferably from 1:110 to 130:1.

Quinones are known to exhibit pesticidal activity. Dithianon, 5,10-dihydro-5,10-dioxonaphtho[2,3-b]-pdithin-2,3-dicarbonitrile, chloranil, 2,3,5,6-tetrachloro-I, 4-benzoquinone and dichlone, 2,3-dichloronaphthoquinone-I,4 are non-limiting examples of quinone fungicides.

Succinate dehydrogenase inhibitors are fungicides that act by targeting the enzyme succinate dehydrogenase. Non-limiting examples of succinate dehydrogenase inhibitors are adepidyn, benodanil, benzovindiflupyr, bixafen, boscalid, carboxin, fenfuram, fluindapyr, fluopyram, flutolanil, fluxapyroxad, furametpyr, inpyrfluxam, isofetamid, isopyrazam, mepronil, oxycarboxin, penflufen, penthiopyrad, pydiflumetofen, sedaxane, and thifluzamide.

Benzamide fungicides act by destroying microtubules, which affect mitosis and cell division, thus inhibiting germ tube and mycelial growth. Non-limiting examples of benzamide fungicides are benzohydroxamic acid, fluopicolide, fluopimomide, fluopyram, tioxymid, trichlamide, zarilamid and zoxamid.

Demethylation inhibitor fungicides, also known as sterol biosynthesis inhibiting fungicides, act by inhibiting the biosynthesis of ergosterol which is a major component of the plasma membrane of certain fungi and needed for fungal growth. Demethylation inhibitor fungicides belong to FRAC code 3 and include triazoles and imidazoles. Non-limiting examples of demethylation inhibitor fungicides are propiconazole, myclobutanil, tebuconazole and triflumizole.

Phenylamide fungicides are a highly active class of fungicides specifically controlling plant pathogens of the Oomycetes (the downy mildews of the Peronosporales and Sclerosporales, as well as most members of the Pythiales (e.g. *Phytophthora* and *Pythium* spp.) and Saprolegniales. They act by inhibiting rRNA biosynthesis (polymerase complex I) in the target plant pathogens. When applied to fungal plant pathogens, they penetrate the plant tissue rapidly and are translocated acropetally within the plant. Non-limiting examples of phenylamide fungicides are metalaxyl, metalaxyl-M (which is also known as mefenoxam), furalaxyl, oxadixyl, benalaxyl, benalaxyl-M (which is also known as kiralaxyl) and ofurace.

Copper has a very broad spectrum of control of fungal and bacterial pathogens and has been used globally to control more than 200 disease species. Copper also has the advantage of being safe to plants, animals and the environment and it is accepted in organic production. Copper fungicides are protectants that must be applied prior to infection: they have no curative or systemic action. They provide multi-site activity and Cu++ ions interfere with biomolecules (due to their chelating properties) and affect protein structure, the function of enzymes, energy transport systems and membranes. Non-limiting examples of copper fungicides are copper oxychloride, copper hydroxide, copper sulphate, copper octanoate and cuprous oxide, or any hydrates or derivatives thereof.

Piperidinyl thiazole isoxazoline fungicides are recently discovered class of fungicides which are deemed to act at a unique site of action in oomycete pathogens with no known cross-resistance to other fungicides. A non-limiting example for this class is oxathiapiprolin (approved ISO common name). Oxathiapiprolin is highly effective for the control of *Phytophthora infestans* and other economically important oomycete pathogens at use rates much lower than current commercial fungicides. Its new mode of action makes oxathiapiprolin a valuable option for fungicide resistance management strategies.

According to a preferred embodiment of the first aspect of the present invention, said at least one additional fungicide is selected from the group consisting of dithianon, isofetamid, zoxamid, fluopicolide, sulphur, valifenalate and tagatose. According to another preferred embodiment of the first aspect of the present invention, cuprous oxide is selected as said at least one additional fungicide.

In a preferred embodiment, the fungicide composition comprises as component (A) a fungicidally active amount of choline phosphonate and as component (B) dithianon, wherein a weight ratio of components (A) and (B) is in a range from 2:1 to 32:1, more preferably from 3:1 to 26:1, even more preferably from 4:1 to 20:1, yet even more preferably from 5:1 to 14:1 and most preferably from 6:1 to 10:1.

In a preferred embodiment, the fungicide composition comprises as component (A) a fungicidally active amount of choline phosphonate and as component (B) isofetamid, wherein a weight ratio of components (A) and (B) is in a range from 5:1 to 120:1, more preferably from 14:1 to 95:1, even more preferably from 20:1 to 70:1, yet even more preferably from 26:1 to 45:1 and most preferably from 30:1 to 34:1.

In a preferred embodiment, the fungicide composition comprises as component (A) a fungicidally active amount of choline phosphonate and as component (B) zoxamid, wherein a weight ratio of components (A) and (B) is in a range from 6:1 to 100:1, more preferably from 8:1 to 80:1, even more preferably from 10:1 to 60:1, and yet even more preferably from 12:1 to 30:1.

In a preferred embodiment, the fungicide composition comprises as component (A) a fungicidally active amount of choline phosphonate and as component (B) fluopicolid, wherein a weight ratio of components (A) and (B) is in a range from 6:1 to 100:1, more preferably from 11:1 to 80:1, even more preferably from 16:1 to 60:1, yet even more preferably from 21:1 to 40:1 and most preferably from 24:1 to 26:1.

In a preferred embodiment, the fungicide composition comprises as component (A) a fungicidally active amount of choline phosphonate and as component (B) sulphur, wherein a weight ratio of components (A) and (B) is in a range from 1:8 to 1:1, more preferably from 1:6 to 1:1.3, even more preferably from 1:5 to 1:1.6, and yet even more preferably from 1:4 to 1:1.8.

In a preferred embodiment, the fungicide composition comprises as component (A) a fungicidally active amount of choline phosphonate and as component (B) valifenalate, wherein a weight ratio of components (A) and (B) is in a range from 2.5:1 to 40:1, more preferably from 5:1 to 32:1, even more preferably from 7:1 to 24:1, yet even more preferably from 8:1 to 16:1 and most preferably from 9:1 to 11:1.

In a preferred embodiment, the fungicide composition comprises as component (A) a fungicidally active amount of choline phosphonate and as component (B) tagatose, wherein a weight ratio of components (A) and (B) is in a range from 1:5 to 4:1, more preferably from 1:4 to 3:1, even more preferably from 1:3 to 2:1, yet even more preferably from 1:2 to 1.5:1 and most preferably from 1:1.4 to 1:1.

In a preferred embodiment, the fungicide composition comprises as component (A) a fungicidally active amount of choline phosphonate and as component (B) cuprous oxide, wherein a weight ratio of components (A) and (B) is in a range from 1:5 to 10:1, more preferably from 1:3 to 8:1, even more preferably from 1:2 to 6:1, yet even more preferably from 1:1 to 4:1 and most preferably from 2:1 to 3.2:1.

In the fungicide composition according to the first aspect of the present invention, choline phosphonate has shown an unexpected increase in fungicidal activity when combined with at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols. This increase in fungicidal activity is caused by a synergistic effect when combining choline phosphonate and at least one said additional fungicide according to said weight ratio. Choline phosphonate and at least one said additional fungicide interact in a particularly favorable manner, for example when they are employed for controlling fungal infections of sown and/or planted crop plants, greens/lawns, in fruit plantations (plantation crops) or on non-crop areas (e.g. amenity areas such as squares of residential areas or industrial sites, rail tracks). Surprisingly, the activity of the combination according to the invention of two active compounds, when used against fungal infections, is higher than the activities of the individual components. A true synergistic effect which could not have been predicted therefore exists, not just a complementation of action (additive effect). Choline phosphonate shows the additional advantages of serving as a fertilizer, as a promotor of root formation and might also perform a plant strengthening effect. For controlling fungal infections, it is particularly advantageous to apply said fungicide composition according to the first aspect of the present invention in diluted form in water.

The synergistic effect permits a reduction of the application rates of the individual fungicides choline phosphonate at least one said additional fungicide, a higher and/or longer efficacy at the same application rate, the control of fungal infections which were as yet uncontrolled (gaps), control of fungal infections which are tolerant or resistant to individual fungicides or to a number of fungicides, an extension of the period of application and/or a reduction in the number of individual applications required and—as a result for the user—fungal infection control systems which are more advantageous economically and ecologically.

Choline phosphonate is a choline salt of phosphorous acid. "Choline phosphite" can be used as a synonym of choline phosphonate. Choline phosphonate can also be called trimethyl hydroxyethyl ammonium phosphite. Choline phosphonate has been described in WO2007/071428A2. Due to the fungicide active properties of both choline and phosphonate, as described above, choline phosphonate is a fungicidal compound with desired fungicidal action.

Dithianon (IUPAC name: 5,10-dioxobenzo[g][1,4]benzodithiine-2,3-dicarbonitrile) is a chemical compound from the group of quinone fungicides. The mode of action of dithianon is that it is a multi-site inhibitor of protein formation that acts by modifying the sulfydryl groups found in the cysteine residues of many proteins. This protein inhibition prevents spore germination and germ tube growth. Dithianon is effective at controlling a wide range of fungal foliar diseases, including scab on pome fruit; *Stigmina carpophila, Coccomyces hiemalis* and scab on cherries; *Monilia* spp., rust and leaf curl on peaches and apricots; leaf spot and rust on currants; *Didymella applanata* on raspberries; *Mycosphaerella fragariae* and *Diplocarpon earliana* on strawberries; *Plasmopara viticola* on vines; downy mildew on hops; scab and *Phomopsis citri* on citrus fruit; *Ascochyta chrysanthemion* on chrysanthemums; *Glomerella cingulata* on coffee; *Marssonina* leaf spot on poplars.

Isofetamid (IUPAC name: N-[1,1-dimethyl-2-(4-isopropoxy-o-tolyl)-2-oxoethyl]-3-methylthiophene-2-carboxamide) is a broad-spectrum fungicide belonging to the SDHI (Succinate Dehydrogenase Inhibitors) group. It inhibits succinate dehydrogenase in complex II of fungal mitochondrial respiration and is used to control fungal pathogens belonging to Ascomycetes and Deuteromycetes groups.

Zoxamid (IUPAC name: (RS)-3,5-dichloro-N-(3-chloro-1-ethyl-1-methyl-2-oxopropyl)-ptoluamide), also called zoxamide, is a benzamide fungicide. Zoxamid inhibits tubulin polymerization and arrests nuclear division by binding to the β-subunit of microtubules. Among other applications, zoxamid can be used to control grape downy mildew.

Fluopicolide (IUPAC name: 2,6-dichloro-N-[[3-chloro-5-(trifluoromethyl)pyridin-2-yl]methyl]benzamide) is a benzamide fungicide. Fluopicolide is effective at low application rates against a wide range of Oomycete (Phycomycete) diseases including downy mildews (*Plasmopara, Pseudoperonospora, Peronospora, Bremia*), late blight (*Phytophthora*), and some *Pythium* species. Fluopicolide can be used for foliar use on grape, rasin, cucurbits and corn, and is also suitable for non-food uses for treating turfs and ornamentals.

The use of sulphur as a fungicide is well-known. Sulphur, in its elemental form, also called elemental sulphur, is used on large scale against various plant pathogenic fungi, for instance *Venturia inequalis*, the cause of scab on apple and *Uncinula necator*, the cause of powdery mildew on grapevine, but also against mites and insects. The term "elemental sulfur" refers to S° sulfur. The term includes allotropes of elemental sulfur such as plastic (amorphous) sulfur, monoclinic sulfur, rhombic sulfur composed of S8 molecules, and other ring molecules such as S7 and S12. "Bio-sulphur" may also be selected as a type of sulphur. "Bio-sulphur" can be provided by a recently discovered process termed THIO-PAQ™ process (U.S. Pat. No. 6,656,249 Issued on Dec. 2, 2003). The Thiopaq process was developed as an alternative to the Claus process. The Thiopaq process uses biological sulfur conversion processes leading to a type of elemental sulfur that is termed bio-sulfur, for biologically produced sulfur. This bio-sulphur has some unique properties, as compared to chemically produced sulfur such as, for example, by the Claus-process. Most important, bio-sulphur is more hydrophilic than chemically produced sulfur. The reason for this is not known. The purity of the bio-sulphur is preferably more than 80% of the total dry mass, more preferred more than 90% of the total dry mass, more preferred more than 95% of the total dry mass, most preferred more than 99% of the total dry mass. That indeed bio-sulphur differs from chemically-produced sulfur is known and recognized in the art. For example, Kleinjan et al. (Kleinjan et al. 2003. Topics in Current Chemistry 230: 44-57) indicates that the density of biologically produced particles is lower than the density of orthorhombic sulfur. In addition, biologically produced sulfur particles have hydrophilic properties whereas orthorhombic sulfur is known to be hydrophobic (Janssen et al. 1999. Colloids and Surfaces A: Physicochemical and Engineering Aspects 151: 389-397). Moreover, other properties of chemically produced sulfur have been reported to differ from microbially produced sulfur (Seidel et al. 2006. Chemosphere 62: 1444-1453).

Except for elemental sulphur and bio-sulphur, other non-limiting examples of sulphur fungicides include zinc bis dimethyldithiocarbamate, tetramethylthiuram disulfide, isoprothiolane, mancozeb, zineb, amobam, and nabam.

Valifenalate (IUPAC name: methyl 3-(4-chlorophenyl)-3-[[(2S)-3-methyl-2-(propan-2-yloxycarbonylamino)butanoyl]amino]propanoate) is a carboxylic acid amide (CAA) fungicide and acts by inhibition of cellulose synthesis of phytopathogenic fungi. Known uses of valifenalate include control of *Plasmopara viticola, Phytophthora infestans,* and *Pseudoperonospora cubensis.*

Tagatose (IUPAC name: (3S,4S,5R)-2-(hydroxymethyl)oxane-2,3,4,5-tetrol) was shown in U.S. Pat. No. 9,125,409B2 to have a high control efficacy against various plant diseases, such as powdery mildew, rust, and plant diseases caused by oomycota. U.S. Pat. No. 9,125,409B2 thus shows that tagatose can be applied as a fungicide. Next to tagatose, any other sugar alcohol might also show fungicidal activity.

Cuprous oxide, also known as copper(I) oxide, is an inorganic copper fungicide and insecticide which can also be used as a mineral supplement for livestock. It is known for effective control of various fungal pathogens including those causing mildews and leaf spots. Examples of crops to which cuprous oxide may be applied for fungal control include mango, avocado, grapes, kiwi, plums, olives, nuts and cocoa.

In this text, derivatives of choline phosphonate and/or at salts and/or derivatives of at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols are also falling within the above definitions of choline phosphonate and at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols. Any salt is possible as long as it is agriculturally acceptable. Examples thereof include alkali metal salts such as a sodium salt and a potassium salt, alkaline earth metal salts such as a magnesium salt and a calcium salt, ammonium salts such as a monomethylammonium salt, a dimethylammonium salt and a triethylammonium salt, inorganic acid salts such as a hydrochloride, a perchlorate, a sulfate and a nitrate salt, and organic acid salts such as an acetate and a methanesulfonate salt. When applicable, at least one said additional fungicide may also be used in the form of a metal chelate, such as a copper chelate.

Although choline phosphonate has proven most efficiently in the fungicide composition according to the first aspect of the present invention, alternative embodiments provide other fungicide compositions that are formulated by applying at least one other phosphonate in addition to or instead of choline phosphonate. Relative amounts of such at least one other phosphonate with regard to at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols, may be included within the ranges disclosed above, or may be situated within other or broader ranges. Said at least one other phosphonate can be selected from, yet is not limited to, the list containing potassium phosphites such as $KH_2PO_3$ and $K_2HPO_3$, sodium phosphites, ammonium phosphites, ethyl hydrogen phosphonate, fosetyl-aluminium complexes, alkali metal or alkali earth metal salts of phosphorous acid, and mixtures of these compounds.

Although dithianon, isofetamid, zoxamid, fluopicolide, sulphur, valifenalate and tagatose have proven most efficiently in the fungicide composition according to the first aspect of the present invention, alternative embodiments provide other fungicide compositions that are formulated by applying at least one other additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols in addition to or instead of dithianon, isofetamid, zoxamid, fluopicolide, sulphur, valifenalate and/or tagatose. Relative amounts of such fungicides with regard to choline phosphonate, and/or alternative phosphonates, may be included within the ranges disclosed above, or may be situated within other or broader ranges.

The combined application described above can offer both leaf, curative and systemic action. Herein, the term "leaf action" refers to fungicidal activity obtained by application to above-ground or exposed portions of plants, such as crops, that have risen above the surface of a soil and that are infected with the fungal infections. By the term "curative action", fungicide action is meant with regard to fungal infections already present on plants. By the term "systemic action", it is meant that a fungicide is readily translocated as such in a plant, rendering tissues penetrated toxic to fungi. Said synergistic effect of choline phosphonate at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols can be observed, for example, in the case of a ready-mix application, of, for example, a ready-to-use (RTU) formulation, emulsifiable concentrate (EC) formulation, microemulsifiable concentrate, concentrated emulsion (EW) formulation, microemulsion (ME) formulation, suspension concentrate (SC) formulation, preferably aqueous SC formulation, oil dispersion (OD) formulation, suspo-emulsion (SE) formulation, suspension of microcapsules (CS) formulation, soluble liquid (SL) formulation, wettable powder (WP) formulation, water dispersible granule (WG), water soluble powder (SP) formulation, water soluble granule (SG) formulation, and in the case of a tank mix; however, they can also be observed when the active compounds are applied at different times (splitting) (packed, for example, as combipack or monodoses). It is also possible to apply the fungicides or the fungicide composition in a plurality of portions (sequential application). If choline phosphonate and at least one said additional fungicide are to be applied as a tank mix, it has to be ensured that an obtained spray liquor is applied relatively quickly after preparation. Preferably, said formulations or concentrates comprise between 0.1 and 99.9% by weight of active compound, preferably between 0.15 and 95% by weight, and preferably between 0.2 and 90% by weight. According to preferred embodiments of the first aspect of the present invention, the fungicide composition comprises 5 to 90% by weight, more preferably 10 to 80% by weight, more preferably 15 to 70% by weight, even more preferably 20 to 60% by weight, more preferably 25 to 50% by weight and yet even more preferably 30 to 40% by weight of choline phosphonate, and also comprises 5 to 90% by weight, more preferably 8 to 75% by weight, more preferably 11 to 65% by weight, even more preferably 14 to 55% by weight, more preferably 18 to 45% by weight and yet even more preferably 20 to 35% by weight of one or more sulphur fungicides. According to preferred embodiments of the first aspect of the present invention, the fungicide composition comprises 5 to 90% by weight, more preferably 10 to 80% by weight, more preferably 15 to 70% by weight, even more preferably 20 to 60% by weight, more preferably 25 to 55% by weight and yet even more preferably 35 to 45% by weight of choline phosphonate, and also comprises 0.1 to 90% by weight, more preferably 0.5 to 60% by weight, more preferably 0.9 to 40% by weight, even more preferably 1.3 to 20% by weight, more preferably 1.7 to 10% by weight and yet even more preferably 2 to 5% by weight of one or more carboxylic acid amide fungicides. Preferably, valifenalate is selected as a carboxylic acid amide fungicide.

According to embodiments of the first aspect of the present invention, the fungicide components choline phosphonate and at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols may be formulated together in an appropriate ratio of the present invention (combination formulation), together with conventional formulation aids as known in the art, such as, for example, one or more carriers.

In a preferred embodiment, the fungicide composition according to the first aspect of the present invention further comprises one or more additional components selected from the group comprising other fungicides, other pesticides such as herbicides, insecticides, or other active pesticide ingredients, safeners, antioxidants, chemical stabilizers, adhesives, fertilizers, perfumes, colorants, liquid carriers, solid carriers, surface-active agents, crystallisation inhibitors, viscosity modifiers, suspending agents, spray droplet modifiers, pigments, foaming agents, light-blocking agents, compatibility agents, antifoam agents, sequestering agents, neutralising agents and buffers, wetting and dispersing agents, preservatives, thickening agents, corrosion inhibitors, freezing point depressants, odorants, spreading agents, penetration aids, micronutrients, emollients, lubricants, sticking agents and humectants, such as, for example, propylene glycol. According to preferred embodiments, the fungicide composition can also comprise various agrochemically active compounds, for example from the group of the acaricides, nematicides, bird repellants, and soil structure improvers.

Non-limiting examples of colorants include inorganic pigments such as iron oxide, titanium oxide and Prussian blue and/or organic dyes such as alizarin dyes, azo dyes and metal phthalocyanine, and trace elements such as iron, manganese, boron, copper, cobalt, molybdenum and zinc.

In a preferred embodiment of the first aspect of the invention, the fungicide composition comprises one or more dispersing agents and/or wetting agents, and preferably in an amount of 0.1 to 10% by weight, more preferably 0.5 to 7% by weight and even more preferably 0.7 to 4% by weight, based on the total weight of the composition. Non-limiting examples of dispersing agents and/or wetting agents include ethylene oxide/propylene oxide condensates; polyaminoamide resins or derivatives thereof; ethylene oxide/propylene oxide block copolymers, alkyl,aryl- and aryl, arylethoxylates and derivatives thereof, like tristyrylphenol ethoxylates, such as tristyrylphenol ethoxylate phosphate ester or a salt, e.g. a triethanolamine salt, thereof; lignosulphonates like calcium lignosulphonates, sodium lignosulphonates, or derivates thereof; alkyl naphthalene sulphonates, like alkyl naphthalene sulphonic acid, sodium salt; cresol- and naphthaleneformaldehyde condensates and the sulphonates thereof; polyarylsulphonate condensates; polycarboxylates, polymeric comb copolymers, alkyl ether phosphates, ether sulphates and derivatives thereof; an acrylic ester/acrylic acid copolymer including polyethylene glycol ester side chains; and mixtures thereof.

In a preferred embodiment of the first aspect of the invention, the fungicide composition comprises one or more freezing point depressants, and preferably in an amount of 0.5 to 10% by weight, more preferably 1 to 8% by weight and even more preferably 2 to 6% by weight, based on the total weight of the composition. Non-limiting examples of freezing point depressants include glycol-based freezing point depressants like monopropylene glycol.

In a preferred embodiment of the first aspect of the invention, the fungicide composition comprises one or more antifoam agents, and preferably in an amount of 0.01 to 2% by weight, more preferably 0.04 to 1% by weight and even more preferably 0.07 to 0.4% by weight, based on the total weight of the composition. Non-limiting examples of antifoam agents include antifoam silicone oil emulsions, preferably aqueous silicone oil emulsions.

In a preferred embodiment of the first aspect of the invention, the fungicide composition comprises one or more preservatives, and preferably in an amount of 0.01 to 2% by weight, more preferably 0.05 to 1% by weight and even more preferably 0.06 to 0.4% by weight, based on the total weight of the composition. Non-limiting examples of preservatives include isothiazolones acids, such as methylisothiazol-3-one (methylisothiazol-3-one) (MIT), 5-chloro-2-methyl-4-isothiazolin-3-one (5-chloro-2-methyl-4-isothiazolin-3-one) (CMIT), 4,5-dichloro-2-n-octyl-4-isothiazolin-3-one (4,5-dichloro-2-n-octyl-4-isothiazolin-3-one) (DCOIT), octyl-isothiazol-3-one (octylisothiazol-3-one) (OIT), 1,2-benz isothiazole-3 (2H)-one (1,2-benzisothiazol-3 (2H)-one) (BIT), N-methyl-1,2-isothiazol-3-one (N-methyl-1,2-benzisothiazol-3-one) MBIT), and N-(n-butyl)-1,2-isothiazol-3-one (N-(n-butyl)-1,2-benzisothiazol-3-one) (BBIT).

In a preferred embodiment of the first aspect of the invention, the fungicide composition comprises one or more chemical stabilizers, and preferably in an amount of 0.01 to 2% by weight, more preferably 0.05 to 1% by weight and even more preferably 0.1 to 0.4% by weight, based on the total weight of the composition. Non-limiting examples of chemical stabilizers include citric acid and phosphoric acid.

In a preferred embodiment of the first aspect of the invention, the fungicide composition comprises one or more viscosity modifiers, and preferably in an amount of 0.01 to 2% by weight, more preferably 0.05 to 1% by weight and even more preferably 0.1 to 0.5% by weight, based on the total weight of the composition. Non-limiting examples of viscosity modifiers include xanthan gum, guar gum, succinoglycan gum, sodium alginate, swelling clays, silica and cellulose derivatives.

In a preferred embodiment of the first aspect of the invention, the fungicide composition comprises one or more spreading agents and/or sticking agents, and preferably in an amount of 0.5 to 8% by weight, more preferably 0.05 to 10% by weight and even more preferably 1 to 5% by weight, based on the total weight of the composition. Non-limiting examples of spreading agents and/or sticking agents include ethyl hydroxyl ethyl cellulose, hydroxy ethyl cellulose, hydroxy propyl cellulose, hydroxy ethyl methyl cellulose, hydroxy propyl methyl cellulose, methyl cellulose, ethyl cellulose, ethyl methyl cellulose, cross-linked sodium carboxymethyl cellulose, low molecular weight carboxymethylcellulose and enzymically hydrolyzed carboxymethylcellulose.

In a preferred embodiment, said one or more additional herbicides are selected from the group comprising acetochlor, acifluorfen, aclonifen, acrolein, AKH-7088, alachlor, alloxydim, ametryn, amicarbazone, amidosulfuron, amitrole, ammonium sulfamate, anilofos, asulam, atrazine, azafenidin, azimsulfuron, BAS 625 H, beflubutamid, benazolin, benfluralin, benfuresate, bensulfuron-methyl, bensulide, bentazone, benzofenap, benzobycyclon, bicyclopyrone, bifenox, bilanafos, bispyribac-sodium, borax, bromacil, bromobutide, bromoxynil, butachlor, butafenacil, butamifos, butralin, butroxydim, butylate, cafenstrole, carbetamide, carfentrazone-ethyl, chloramben, chlorbromuron, chlorflurenol-methyl, chloridazon, chlorimuron-ethyl, chloroacetic acid, chlorotoluron, chlorpropham, chlorsulfuron, chlorthal-dimethyl, chlorthiamid, cinidon-ethyl, cinmethylin, cinosulfuron, clethodim, clodinafop-propargyl, clomazone, clomeprop, clopyralid, cloransulam-methyl, cumyluron, cyanazine, cycloate, cyclosulfamuron, cycloxydim, cyhalofop-butyl, 2,4-D, daimuron, dalapon, dazomet, 2,4-DB, desmedipham, dicamba, dichlobenil, dichlorprop, dichlorprop-P, diclofop-methyl, diclosulam, difenzoquat metilsulfate, diflufenican, diflufenzopyr, dimefuron, dimepiperate, dimethachlor, dimethametryn, dimethenamid, dimethipin, dimethylarsinic acid, dinitramine, dinoterb, diphenamid, diquat dibromide, dithiopyr, diuron, DNOC, endothal, EPTC, esprocarb, ethalfluralin, ethametsulfuron-methyl, ethofumesate, ethoxysulfuron, etobenzanid, fenoxaprop-P-ethyl, fentrazamide, fenuron, ferrous sulfate, flamprop-M, flazasulfuron, florasulam, fluazifop-butyl, fluazifop-P-butyl, fluazolate, flucarbazone-sodium, fluchloralin, flufenacet, flumetsulam, flumiclorac-pentyl, flumioxazin, fluometuron, fluoroglycofen-ethyl, flupropanate, flupyrsulfuron-methyl-sodium, flurenol, fluridone, flurochloridone, fluroxypyr, flurtamone, fluthiacet-methyl, fomesafen, fosamine, glufosinate-ammonium, glyphosate, halauxyfen, halauxyfen-methyl, halosulfuron-methyl, haloxyfop, HC-252, hexazinone, imazamethabenz-methyl, imazamox, imazapic, imazapyr, imazaquin, imazethapyr, imazosulfuron, indanofan, iodosulfuron-methyl-sodium, ioxynil, isoproturon, isouron, isoxaben, isoxachlortole, isoxaflutole, lactofen, lenacil, linuron, MCPA, MCPA-thioethyl, MCPB, mecoprop, mecoprop-P, mefenacet, mefluidide, mesotrione, metam, metamitron, metazachlor, methabenzthiazuron, methylarsonic acid, methyldymron, methyl isothiocyanate, metobenzuron, metobromuron, metolachlor, S-metolachlor, metosulam, metoxuron, metribuzin, metsulfuron-methyl, MK-616, MKH 6561, molinate, monolinuron, naproanilide, napropamide, naptalam, neburon, nicosulfuron, nonanoic acid, norflurazon, oleic acid (fatty acids), orbencarb, oryzalin, oxadiargyl, oxadiazon, oxasulfuron, oxaziclomefone, oxyfluorfen, paraquat dichloride, pebulate, pelargonic acid, pendimethalin, pentachlorophenol, pentanochlor, pentoxazone, petroleum oils, phenmedipham, picloram, picolinafen, piperophos, pretilachlor, primisulfuron-methyl, prodiamine, prometon, prometryn, propachlor, propanil, propaquizafop, propazine, propham, propisochlor, propyzamide, prosulfocarb, prosulfuron, pyraflufen-ethyl, pyrasulfotole, pyrazolynate, pyrazosulfuron-ethyl, pyrazoxyfen, pyribenzoxim, pyributicarb, pyridafol, pyridate, pyriminobac-methyl, pyrithiobac-sodium, quinclorac, quinmerac, quinoclamine, quizalofop, quizalofop-P, rimsulfuron, sethoxydim, siduron, simazine, simetryn, sodium chlorate, sulcotrione, sulfentrazone, sulfometuron-methyl, sulfosulfuron, sulfuric acid, tar oils, 2,3,6-TBA, TCA-sodium, tebutam, tebuthiuron, tefuryltrione, tembotrione, tepraloxydim, terbacil, terbumeton, terbuthylazine, terbutryn, thenylchlor, thiazopyr, thifensulfuron-methyl, thiobencarb, tiocarbazil, tolpyralate, topramezone, tralkoxydim, tri-allate, triasulfuron, triaziflam, tribenuron-methyl, triclopyr, trietazine, trifluralin, triflusulfuron-methyl, and vernolate.

In a preferred embodiment, said one or more additional insecticides are selected from the group comprising 5-(2-chloropyrid-5-ylmethyl)-3-methyl-4-nitroiminoperhydro-1,3,5-oxadiazine, 5-(2-chlorothiazol-5-ylmethyl)-3-methyl-4-nitroiminoperhydro-1,3,5-oxadiazine, 3-methyl-4-nitroimino-5-(1-oxido-3-pyridinomethyl)perhydro-1,3,5-oxadiazine, 5-(2-chloro-1-oxido-5-pyridiniomethyl)-3-methyl-4-nitroiminoperhydro-1,3,5-oxidiazine, 3-methyl-5-(2-methylpyrid-5-ylmethyl)-4-nitroiminoperhydro-1,3,5-oxadiazine, thiamethoxam (CAS RN 153719-23-4), acetamiprid ((E)-N-[(6-chloro-3-pyridinyl)methyl]-N'-cyano-N-methyleneimidamide, CAS RN 135410-20-7), imidacloprid (1-[(6-chloro-3-pyridinyl)methyl]-N-nitro-2-imidazolidinimime, CAS RN 138261-41-3), nitenpyram (N-[(6-chloro-3-pyridinyl)methyl]-N-ethyl-N'-methyl-2-nitro-1,1-ethenediamine, CAS RN 120738-89-8), clothianidin (TI-435; N-[(2-chloro-5-thiazoyl)methyl]-N'-methyl-N'''-nitro,[C(E)]-(9Cl)-guanidine, CAS RN 210880-92-5), dinotefuran (N-methyl-N'-nitro-N'''-[(tetrahydro-3-furanyl)methyl)]guanidine; CAS RN 165252-70-0), acephate (CAS RN 30560-19-1), chlorpyrifos (CAS RN 2921-88-2), chlorpyrifos-methyl (CAS RN 5598-13-0), diazinon (CAS RN 333-41-5), fenamiphos (CAS RN 22224-92-6), malathion (CAS RN 121-75-5), aldicarb (CAS RN 116-06-3), carbaryl (CAS RN 63-25-2), carbofuran (CAS RN 1563-66-2), oxamyl (CAS RN 23135-22-0) and thiodicarb (CAS RN 59669-26-0).

In a preferred embodiment, said one or more additional other fungicides are selected from the group comprising respiration inhibitors selected from the group comprising azoxystrobin, dimoxystrobin, enestroburin, fluoxastro-bin, kresoxim-methyl, meto-minostrobin, orysastrobin, picoxystrobin, pyraclostrobin, pyrametostrobin, pyraoxystrobin, pyribencarb, trifloxystrobin, methyl(2-chloro-5 [1-(3-methylbenzyl-oxy-imino)-ethyl]benzyl)-carba-mate, 2 (2-(3-(2,6-di-chlorophenyl)-1-methyl-allylidene-aminooxy-methyl)-phenyl)-2-methoxyimino-N methyl-acetamide, famoxadone, fenamidone, benodanil, bixafen, boscalid, carboxin, fen-furam, fenhexamid, fluopyram, flutolanil, furametpyr, isopyrazam, isotianil, mepronil, oxycarboxin, penflufen, penthiopyrad, sedaxane, tecloftalam, thifluz-amide, tiadinil, 2-amino-4 methyl-thiazole-5-carbox-anilide, N-(3',4',5' tri-fluoro-bi-phenyl-2 yl)-3-difluoro-methyl-1-methyl-1H-pyrazole-4 carboxamide, N-(4'-tri-fluoro-methyl-thiobiphenyl-2-yl)-3 difluoromethyl-1-methyl-1H pyrazole-4-carbox-amide, N-(2-(1,3,3-trimethyl-butyl)-phenyl)-1,3-dimethyl-5 fluoro-1H-pyrazole-4 carbox-amide, cyazofamid, amisulbrom, diflumetorim, binapacryl, dinobuton, dinocap, fluazinam, nitrthal-isopropyl, tecnazen, ferimzone, fentin salts, ametoctradin and silthiofam; sterol biosynthesis inhibitors (SBI fungicides) selected from the group comprising azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, paclobutrazole, penconazole, propiconazole, prothio-conazole, simeconazole, tebuconazole, tetraconazole, triadimefon, triadimenol, triticonazole, uniconazole, imazalil, pefurazoate, oxpoconazole, prochloraz, triflumizole, fenarimol, nuarimol, pyrifenox, triforine, aldimorph, dodemorph, dodemorph-acetate, fenpropimorph, tridemorph, fenpropidin, piperalin, spiroxamine, fenhexamid, benalaxyl, benalaxyl-M, kiralaxyl, metalaxyl, metalaxyl-M (mefenoxam), ofurace, oxadixyl, hymexazole, octhilinone, oxolinic acid, bupirimate, benomyl, carbendazim, fuberidazole, thiabendazole, thiophanate-methyl, 5-chloro-7(4-methyl-piperidin-1-yl)-6-(2,4,6-trifluorophenyl)-[1,2,4]tri-azolo-[1,5a]pyrimidine, diethofencarb, ethaboxam, pencycuron, metrafenone, cyprodinil, mepanipyrim, nitrapyrin, pyrimethanil, blasticidin-S, kasugamycin, kasugamycin hydrochloride-hydrate, mildiomycin, streptomycin, oxytetracyclin, polyoxine, validamycin A, fluoroimid, iprodione, procymidone, vinclozolin, fenpiclonil, fludioxonil, quinoxyfen, edifenphos, iprobenfos, pyrazophos, isoprothiolane, dicloran, quintozene, tecnazene, tolclofos-methyl, biphenyl, chloroneb, etridiazole, dimethomorph, flumorph, mandiproamid, pyrimorph, benthiavalicarb, iprovalicarb, pyribencarb, N-(1-(1-(4-cyano-phenyl)-ethanesulfonyl)-but-2-yl) carbamic acid-(4-fluorophenyl) ester, propamocarb, propamo-carb-hydrochlorid, Bordeaux mixture, copper acetate, copper hydroxide, copper oxychloride, basic copper sulfate, ferbam, mancozeb, maneb, metam, methasulphocarb, metiram, propineb, thiram, zineb, ziram, anilazine, chlorothalonil, captafol, captan, folpet, dichlofluanid, dichlorophen, flusulfamide, hexachlorobenzene, pentachlorphenole and its salts, phthalide, tolylfluanid, N-(4-chloro-2-nitro-phenyl)-N-ethyl-4-methyl-benzene-sulfonamide, guanidine, dodine, dodine free base, guazatine, guazatine-acetate, iminoctadine, iminoctadine-triacetate, iminoctadine-tris(albesilate), validamycin, polyoxin B, pyroquilon, tricyclazole, carpropamide, dicyclomet, fenoxanil, acibenzolar-S-methyl, probenazole, isotianil, tiadinil, prohexadione-calcium, fosetyl, fosetyl-aluminum, phosphorous acid and its salts, bronopol, chinomethionat, cyflufenamid, cymoxanil, dazomet, debacarb, diclomezine, difenzoquat, difenzoquat-methylsulfate, diphenylamin, flumetover, flusulfamide, flutianil, methasulfocarb, natamycin, oxincopper, proquinazid, tebufloquin, tecloftalam, triazoxide, 2-butoxy-6-iodo-3-propylchromen-4-one, N-(cyclo-propyl-methoxyimino-(6-difluoro-methoxy-2,3-difluoro-phenyl)-methyl)-2-phenyl acetamide, N'-(4-(4-chloro-3-trifluoromethyl-phenoxy)-2,5-dimethyl-phenyl)-N-ethyl-N methyl formamidine, N' (4-(4-fluoro-3-trifluoromethyl-phenoxy)-2,5-dimethyl-phenyl)-N-ethyl-N-methyl formamidine, N'-(2-methyl-5-trifluoromethyl-4-(3-trimethyl-silanyl-prop-oxy)-phenyl)-N-ethyl-N-methyl formamidine, N'-(5-difluoromethyl-2 methyl-4-(3-tri-methylsilanyl-propoxy)-phenyl)-N-ethyl-N-methyl formamidine, 2-{1-[2-(5-methyl-3-trifluoromethyl-pyrazole-1-yl)-acetyl]-piperidin-4-yl}-thiazole-4-carboxylic acid methyl-(1,2,3,4-tetrahydro-naphthalen-1-yl)-amide, 2-{1-[2-(5-meth-yl-3-trifluoromethyl-pyrazole-1-yl)-acetyl]-piperidin-4-yl}-thiazole-4-carboxylic acid methyl-(R)-1,2,3,4-tetrahydro-naphthalen-1-yl-amide, methoxy-acetic acid 6-tert-butyl-8-fluoro-2,3-dimethyl-quinolin-4-yl ester, N-Methyl-2-{1-[(5-methyl-3-trifluoro-methyl-1H-pyr-azol-1-yl)-acetyl]-piperi-din-4-yl}-N-[(1R)-1,2,3,4-tetrahydro-naphthalen-1-yl]-4-thi-azolecarboxamide, 3-[5-(4-chloro-phenyl)-2,3-dimethyl-isoxazolidin-3 yl]-pyridine, 3-[5-(4-methyl-phenyl)-2,3-dimethyl-isoxazolidin-3-yl]-pyridine, 5-amino-2-iso-propyl-3-oxo-4-ortho-tolyl-2,3-dihydro-pyrazole-1 carbo-thioic acid S-allyl ester, N-(6-methoxy-pyridin-3-yl) cyclopropanecarboxylic acid amide, 5-chloro-1 (4,6-dimethoxy-pyrimidin-2-yl)-2-methyl-1H-benzoimidazole, 2-(4- chloro-phenyl)-N-[4-(3,4-dimeth-oxy-phenyl)-isoxazol-5-yl]-2-prop-2-ynyloxy-acetamide, abscisic acid, amidochlor, ancymidol, 6-benzylaminopurine, brassinolide, butralin, chlormequat (chlormequat chloride), choline chloride, cyclanilide, daminozide, dike-gulac, dimethipin, 2,6-dimethylpuridine, ethephon, flumetralin, flurprimidol, fluthiacet, forchlorfenuron, gibberellic acid, inabenfide, indole-3-acetic acid, maleic hydrazide, mefluidide, mepiquat (mepiquat chloride), naphthaleneacetic acid, N 6 benzyladenine, paclobutrazol, prohexadione (prohexadione-calcium), prohydrojasmon, thidiazuron, triapenthenol, tributyl phosphorotrithioate, 2,3,5 tri iodobenzoic acid, trinexapac-ethyl and uniconazole, and antifungal biocontrol agents.

Whilst compositions comprising choline phosphonate and at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols according to the first aspect of the invention and also one or more additional pesticides such as additional other fungicides, insecticides, herbicides or other active pesticide ingredients are disclosed above, the skilled man will appreciate that the invention extends to further multiple combinations comprising the above mixtures. For the avoidance of doubt, even if not explicitly stated here, mixing partners may also be in the form of any suitable agrochemically acceptable ester or salt, as mentioned e.g. in The Pesticide Manual, Thirteenth Edition, British Crop Protection Council, 2003.

Suitable agricultural adjuvants and carriers that are useful in formulating the compositions of the invention in the formulation types described above are well known to those skilled in the art. Suitable examples of the different classes are found in the non-limiting lists below.

Liquid carriers that can be employed include water and one or more solvents selected from the group comprising toluene, xylene, petroleum naphtha, p-diethyl benzene, isopropyl benzene, m-xylene, o-xylene, p-xylene; cyclohexane, hexadecane, isooctane, n-hexane; paraffin oil, mineral oil, crop oil; chlorobenzene, 1,2-dichloropropane, 1.1-trichloroethane, methylene chloride, trichloroethylene, perchloroethylene; alpha-pinene, d-limonene; lactic acid and ester derivatives, such as methyl lactate, ethyl lactate, butyl lactate, 2-ethylhexyl lactate; octadecanoic acid, oleic acid, propionic acid, xylene sulphonic acid and their ester forms; cyclohexanol, diacetone alcohol, diethylene glycol, dipropylene glycol, 2-ethyl hexanol, ethylene glycol, phenol, polyethylene glycol (PEG400), propylene glycol, triethylene glycol, methanol, ethanol, isopropanol, and higher molecular weight alcohols such as amyl alcohol, tetrahydrofurfuryl alcohol, hexanol, octanol, ethylene glycol, propylene glycol, glycerol, benzyl alcohol; acetone, methyl ethyl ketone, cyclohexanone, acetophenone, 2-butanone, 2-heptanone, gamma-butyrolactone, glycerol, isophorone, mesityl oxide, methyl isoamyl ketone, methyl isobutyl ketone; diethylene glycol butyl ether, diethylene glycol ethyl ether, 1,4-dioxane, dipropylene glycol methyl ether, propylene glycol ethers (diproxitol), ethylene glycol butyl ether, ethylene glycol methyl ether, methoxy propanol, propylene glycol monomethyl ether; alkyl acetates such as ethyl acetate, propyl acetate, n-butyl acetate, amyl acetate, isoamyl acetate, isobornyl acetate, octyl amine acetate, glycerol monoacetate, glycerol diacetate, glycerol triacetate, 2-ethyl hexyl stearate, methyl oleate, n-butyl oleate, isopropyl myristate, methyl laurate, methyl octanoate, diethylene glycol abietate, dipropylene glycol dibenzoate, propylene glycol dioleate, di-octyl succinate, di-butyl adipate, di-octyl phthalate, triethyl phosphate, dibasic esters (dimethyl glutarate+dimethyl succinate+dimethyl adipate), butyl benzoate; ethylene carbonate, propylene carbonate and butylene carbonate; diethanolamine, laurylamine, n-octylamine, oleylamine; N,N-dimethyl alkylamides such as N,N-dimethyl formamide, N,N-dimethylacetamide, N,N-dimethyl octan/decanamide, N,N-dimethyl decanamide, N,N-dimethyl dodecanamide, dimethyl lactamide; methyl 5-(dimethylamino)-4-methyl-5-oxopentanote; alkyl pyrrolidinones, such as N-methyl-2-pyrrolidinone, N-ethyl-2-pyrrolidinone; dimethyl sulfoxide; acetonitrile; acetic anhydride; and the like, soybean oil, rapeseed oil, sunflower seed oil, corn oil, cotton seed oil, linseed oil, safflower oil, olive oil, peanut oil, castor oil, palm oil, coconut oil, sesame oil, tung oil and the like; esters of the above vegetable oils, and the like. Water is generally the carrier of choice for the dilution of concentrates.

Suitable solid carriers include talc, titanium dioxide, pyrophyllite clay, silica, kaolin clay, attapulgite clay, kieselguhr, chalk, diatomaceous earth, lime, montmorillonite clay, lime, calcium carbonate, bentonite clay, fuller's earth, cottonseed hulls, wheat flour, soybean flour, pumice, wood floor, walnut shell flour, lignin, cellulose and the like.

A broad range of surface-active agents are advantageously employed in both said liquid and solid compositions, especially those designed to be diluted with carrier before application. Surface-active agents, also known as surfactants, are compounds that lower the surface tension (or interfacial tension) between two liquids or between a liquid and a solid. Surface-active agents can be anionic, cationic, non-ionic or polymeric in character and may act as detergents, wetting agents, emulsifiers, foaming agents, and dispersants. Many organic compounds exhibit some surface-active properties; however specifically for the purposes of the invention nonionic surface-active agents can be used. Prominent among these are the fatty alcohols, such as cetyl alcohol, stearyl alcohol, and cetostearyl alcohol (consisting predominantly of cetyl and stearyl alcohols), and oleyl alcohol; but also polyethylene glycol alkyl ethers such as octaethylene glycol monododecyl ether and pentaethylene glycol monododecyl ether; polypropylene glycol alkyl ethers; polyethylene glycol-polypropylene glycol alkyl ethers; glucoside alkyl ethers such as decyl glucoside, lauryl glucoside or octyl glucoside; polyethylene glycol octylphenyl ethers; polyethylene glycol nonylphenyl ethers; polyethylene glycol tributylphenyl ethers; polyethylene glycol tristyrylphenyl ethers; polyethylene glycol-polypropylene glycol tristyrylphenyl ethers; glycerol alkyl esters such as glyceryl laurate; polyoxyethylene glycol sorbitan alkyl esters, such as polysorbates; sorbitan alkyl esters, such as spans; cocamide MEA or DEA; dodecyldimethylamine oxide; block copolymers of polyethylene glycol and polypropylene glycol, such as poloxamers; polyethoxylated tallow amine (POEA); vegetable oil ethoxylates, such as castor oil ethoxylates, rapeseed oil ethoxylates, soybean oil ethoxylates; and the like, salts of alkyl sulfates, such as diethanolammonium lauryl sulfate; alkylarylsulfonate salts, such as calcium dodecylbenzenesulfonate; soaps, such as sodium stearate; alkylnaphtalene-sulfonate salts, such as sodium dibutylnaphtalenesulfonate; dialkyl esters of sulfosuccinate salts, such as sodium di-(2-ethyl hexyl) sulfosuccinate; salts of mono and dialkyl phosphate esters; quaternary amines, such as lauryl trimethylammonium chloride and the like.

The compositions can be formulated with liquid and solid fertilizers, such as particulate fertilizers like ammonium nitrate, urea and the like.

In a preferred embodiment, the fungicide composition according to the first aspect of the present invention additionally comprises one or more compounds that function to improve crop plant compatibility, selected from the group comprising 4-dichloroacetyl-1-oxa-4-aza-spiro[4.5]-decane (AD-67, MON-4660), 1-dichloro-acetyl-hexahydro-3,3,8a-trimethylpyrrolo[1,2-a]-pyrimidin-6(2H)-one (dicyclonon, BAS-145138), 4-dichloroacetyl-3,4-dihydro-3-methyl-2H-1,4-benzoxazine (benoxacor), 1-methyl-hexyl 5-chloro-quinolin-8-oxy-acetate (cloquintocet-mexyl-cf. also related compounds in EP-A-86750, EP-A-94349, EP-A-191736, EP-A-492366), 3-(2-chloro-benzyl)-1-(1-methyl-1-phenyl-ethyl)-urea (cumyluron), α-(cyano methoximino)-phenylacetonitrile (cyometrinil), 2,4-dichloro-phenoxyacetic acid (2,4-D), 4-(2,4-dichloro-phenoxy)-butyric acid (2,4-DB), 1-(1-methyl-1-phenyl-ethyl)-3-(4-methyl-phenyl)-urea (daimuron, dymron), 3,6-dichloro-2-methoxy-benzoic acid (dicamba), S-1-methyl-1-phenyl-ethyl piperidine-1-thiocarboxylate (dimepiperate), 2,2-dichloro-N-(2-oxo-2-(2-propenylamino)-ethyl)-N-(2-propenyl)-acetamide (DKA-24), 2,2-dichloro-N,N-di-2-propenyl-acetamide (dichlormid), 4,6-dichloro-2-phenyl-pyrimidine (fenclorim), ethyl 1-(2,4-dichloro-phenyl)-5-trichloromethyl-1H-1,2,4-triazole-3-carboxylate (fenchlorazole-ethyl-cf. also related compounds in EP-A-174562 and EP-A-346620), phenylmethyl 2-chloro-4-trifluoromethyl-thiazole-5-carboxylate (flurazole), 4-chloro-N-(1,3-dioxolan-2-yl-methoxy)-α-trifluoro acetophenone oxime (fluxofenim), 3-dichloroacetyl-5-(2-furanyl)-2,2-dimethyl-oxazolidine (furilazole, MON-13900), ethyl 4,5-dihydro-5,5-diphenyl-3-isoxazolecarboxylate (isoxadifen-ethyl-cf. also related compounds in WO-A-95/07897), 1-(ethoxycarbonyl)-ethyl 3,6-dichloro-2-methoxybenzoate (lactidichlor), (4-chloro-o-tolyloxy)-acetic acid (MCPA), 2-(4-chloro-o-tolyloxy)-propionic acid (mecoprop), diethyl 1-(2,4-dichloro-phenyl)-4,5-dihydro-5-methyl-1H-pyrazole-3,5-dicarboxylate (mefenpyr-diethyl-cf. also related compounds in WO-A-91/07874), 2-dichloromethyl-2-methyl-1,3-dioxolane (MG-191), 2-propenyl-1-oxa-4-azaspiro[4.5]decane 4-carbodithioate (MG-838), 1,8-naphthalic anhydride, α-(1,3-dioxolan-2-yl-methoximino)-phenylacetonitrile (oxabetrinil), 2,2-dichloro-N-(1,3-dioxolan-2-yl-methyl)-N-(2-propenyl)-acetamide (PPG-1292), 3-dichloroacetyl-2,2-dimethyl-oxazolidine (R-28725), 3-dichloroacetyl-2,2,5-trimethyl-oxazolidine (R-29148), 4-(4-chloro-o-tolyl)-butyric acid, 4-(4-chloro-phenoxy)-butyric acid, diphenylmethoxyacetic acid, methyl diphenylmethoxyacetate, ethyl diphenyl-methoxyacetate, methyl 1-(2-chloro-phenyl)-5-phenyl-1H-pyrazole-3-carboxylate, ethyl 1-(2,4-dichloro-phenyl)-5-methyl-1H-pyrazole-3-carboxylate, ethyl 1-(2,4-dichloro-phenyl)-5-isopropyl-1H-pyrazole-3-carboxylate, ethyl 1-(2,4-dichloro-phenyl)-5-(1,1-dimethyl-ethyl)-1H-pyrazole-3-carboxylate, ethyl 1-(2,4-dichloro-phenyl)-5-phenyl-1H-pyrazole-3-carboxylate (cf also related compounds in EP-A-269806 and EP-A-333131), ethyl 5-(2,4-dichloro-benzyl)-2-isoxazoline-3-carboxylate, ethyl 5-phenyl-2-isoxazoline-3-carboxylate, ethyl 5-(4-fluoro-phenyl)-5-phenyl-2-isoxazoline-3-carboxylate (cf. also related compounds in WO-A-91/08202), 1,3-dimethyl-but-1-yl 5-chloro-quinolin-8-oxy-acetate, 4-allyloxy-butyl 5-chloro-quinolin-8-oxy-acetate, 1-allyloxy-prop-2-yl 5-chloro-quinolin-8-oxy-acetate, methyl 5-chloro-quinoxalin-8-oxy-acetate, ethyl 5-chloro-quinolin-8-oxy-acetate, allyl 5-chloro-quinoxalin-8-oxy-acetate, 2-oxo-prop-1-yl 5-chloro-quinolin-8-oxy-acetate, diethyl 5-chloro-quinolin-8-oxy-malonate, diallyl 5-chloro-quinoxalin-8-oxy-malonate, diethyl 5-chloro-quinolin-8-oxy-malonate (cf. also related compounds in EP-A-582198), 4-carboxy-chroman-4-yl-acetic acid (AC-304415, cf. EP-A-613618), 4-chloro-phenoxy-acetic acid, 3,3'-dimethyl-4-methoxy-benzophenone, 1-bromo-4-chloromethylsulphonyl-benzene, 1-[4-(N-2-methoxybenzoylsulphamoyl)-phenyl]-3-methyl-urea (alias N-(2-methoxy-benzoyl)-4-[(methylamino-carbonyl)-amino]-benzenesulphonamide), 1-[4-(N-2-methoxybenzoylsulphamoyl)-phenyl]-3,3-dimethyl-urea, 1-[4-(N-4,5-dimethylbenzoylsulphamoyl)-phenyl]-3-methyl-urea, 1-[4-(N-naphthylsulphamoyl)-phenyl]-3,3-dimethyl-urea, and N-(2-methoxy-5-methyl-benzoyl)-4-(cyclopropylaminocarbonyl)-benzenesulphonamide.

A second aspect of the present invention provides a kit comprising one or more spatially separated components to be used as a fungicide composition, comprising as component (A) a fungicidally active amount of choline phosphonate and as component (B) at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols, which components are for simultaneous, separate or sequential use.

In a preferred embodiment, the present invention provides a kit according to the second aspect of the invention, comprising one or more spatially separated components according to the fungicide composition according to the first aspect of the present invention.

A kit according to embodiments of the second aspect of the present invention allows for controlling unwanted vegetation in a flexible and modular manner. In particular, uses of said kit include simultaneous, separate or sequential use of the fungicide components.

In embodiments, a use of kit according to the second aspect of the invention involves separate application of the components of the kit, or the use of a mixture of one or more components of the kit, for example as tank mixtures.

In one embodiment, a use of the kit includes sequential use or sequential use of different fungicide components of the kit. This makes it possible to apply several components for a different period, possibly several times. As a result, for example, one or more fungicide components can be applied on one or more crops prior to fungal infection or in an early stage of fungal infection, while one or more other components of the kit can only be applied later. Nevertheless, a user can still provide a combination formulation, such as, for example, a ready-to-use formulation, in order to jointly apply the fungicide components, either in a prescribed, desired or adapted weight ratio.

The use of a kit according to the second aspect of the present invention allows for a high degree of modularity. This has the advantage that a user can adjust the applied amount, the dosage and/or the composition of one or more fungicide components and/or a combination formulation thereof as desired, for example depending on the relative amount of specific undesirable vegetation.

A third aspect of the present invention provides a use of a fungicide composition according to the first aspect of the present invention for controlling one or more types of fungal infections by applying the fungicide composition to the fungal infections.

The fungicide composition according to the first aspect of the present invention has very good fungicidal properties and can be used for controlling fungal infections caused by phytopathogenic fungi.

The fungicide composition according to the first aspect of the present invention can be used, for example, in connection with one or more of the following phytopatogenic fungi: *Plasmopara viticola, Sphaerotheca fuliginea, Erysiphe necator, Venturia inaequalis, Microdochium nivale, Diplocarpon rosae, Marssonina rosae, Diplocarpon rosae, Phytophthora cinnamomi, Podosphaera aphanis, Podosphaera xanthii, Pseudoperonospora cubensis, Spilogea oleagina, Phytophthora infestans, Leveillula taurica, Erysiphe lycopersica*, and/or one or more species of *Erisyphe, Leveillula, Microsphaera, Podosphaera, Odium*, and *Sphaerotheca*.

In an embodiment, the fungicide composition according to the first aspect of the present invention can be used as total fungicide for controlling fungal infections, for example in particular on non-crop areas like amenity areas such as paths, squares and also under trees and shrubs, rail tracks etc. The fungicide composition according to the first aspect of the present invention is distinguished by an action which has a particularly quick onset and lasts for a long time.

The fungicide composition according to the first aspect of the present invention can be prepared by known processes, for example as ready-mix applications of, for example, a ready-to-use (RTU) formulation, emulsifiable concentrate (EC) formulation, microemulsifiable concentrate, suspension concentrate (SC) formulation, oil dispersion (OD) formulation, soluble liquid (SL) formulation, wettable powder (WP) formulation, water dispersible granule (WG), or water soluble granule (SG) formulation, if appropriate with further active compounds, additives and/or customary formulation auxiliaries, which combinations are then applied in a customary manner diluted with water, or as tank mixes by dilution of components, formulated separately or formulated partially separately, with water. Also possible is the split application of the separately formulated or partially separately formulated individual components. It is also possible to use choline phosphonate or at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols or the fungicide combination in a plurality of portions (sequential application).

A preferred variant of the invention relates to processes for controlling fungal infections where component (A) and component (B) of the fungicide combination according to the invention are mixed only shortly before application onto the fungal infections. According to the invention, "shortly before application" means that component (A) and component (B) are mixed preferably less than 6 hours, more preferably less than 3 hours and even more preferably less than 1 hour before application onto the fungal infections.

Other than that, choline phosphonate and at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols provided in accordance with the first aspect of the present invention can be converted together or separately into customary formulations, such as solutions, emulsions, suspensions, powders, foams, pastes, granules, aerosols, natural and synthetic materials impregnated with active compound and microencapsulations in polymeric materials. The formulations may comprise the customary auxiliaries and additives.

These formulations are produced in a known manner, for example by mixing the active compounds with extenders, i.e. liquid solvents, pressurized liquefied gases and/or solid carriers, optionally with use of surface-active agents, i.e. emulsifiers and/or dispersants and/or foam formers.

If the extender used is water, it is also possible to use, for example, organic solvents as auxiliary solvents. Suitable liquid solvents are essentially: aromatics such as xylene, toluene or alkylnaphthalenes, chlorinated aromatics or chlorinated aliphatic hydrocarbons such as chlorobenzenes, chloroethylenes or methylene chloride, aliphatic hydrocarbons such as cyclohexane or paraffins, for example mineral oil fractions, mineral and vegetable oils, such as soybean oil, alcohols such as butanol or glycol and the ethers and esters thereof, ketones such as acetone, methyl ethyl ketone, methyl isobutyl ketone or cyclohexanone, strongly polar solvents such as dimethylformamide or dimethyl sulfoxide, and water.

Useful solid carriers include: for example ammonium salts and ground natural minerals, such as kaolins, clays, talc, chalk, quartz, attapulgite, montmorillonite or diatomaceous earth, and ground synthetic minerals, such as finely divided silica and hydrophobic silica, alumina and silicates; useful solid carriers for granules include: for example crushed and fractionated natural rocks, such as calcite, marble, pumice, sepiolite, dolomite and synthetic granules of inorganic and organic flours, and granules of organic material, such as sawdust, coconut shells, corn cobs and tobacco stalks; useful emulsifiers and/or foam formers include: for example non-ionic and anionic emulsifiers, such as polyoxyethylene fatty acid esters, polyoxyethylene fatty alcohol ethers, e.g. alkylaryl polyglycol ethers, alkylsulfonates, alkylsulfates, arylsulfonates and protein hydrolyzates; useful dispersants include: for example lignosulfite waste liquors and methylcellulose.

In the formulations, it is possible to use tackifiers such as carboxymethylcellulose, natural and synthetic polymers in the form of powders, granules or latices, such as gum arabic, polyvinyl alcohol and polyvinyl acetate, or else natural phospholipids such as cephalins and lecithins and synthetic phospholipids. Further additives may be mineral and vegetable oils.

It is possible to use colorants such as inorganic pigments, for example iron oxide, titanium oxide and Prussian blue, and organic colorants such as alizarin colorants, azo colorants and metal phthalocyanine colorants, and trace nutrients such as salts of iron, manganese, boron, copper, cobalt, molybdenum and zinc.

Preferably, the formulations comprise between 0.1 and 99.9% by weight of active compound, preferably between 0.15 and 95% by weight, and preferably between 0.2 and 90% by weight.

In a preferred embodiment of the use according to the third aspect of the present invention, said fungicide composition is applied onto one or more crops for controlling one or more types of fungal infections, wherein the fungicide composition is reapplied at a specified time interval of 1 day to 50 days, more preferably 2 to 40 days and most preferably 5 to 23 days until harvest of said one or more crops. In preferred embodiments, apple, cucumber, strawberry, grapevine, potato and/or tomato are selected as crops.

In a preferred embodiment of the use according to the third aspect of the present invention, said fungicide composition is applied by spraying, sprinkling, showering, spritzing, spreading in droplets, watering, atomizing, spattering, dispersing, diffusing, broadcasting and/or douching.

In a preferred embodiment of the use according to the third aspect of the present invention, said fungicide composition is applied in a target dose rate of 5 to 10000 g, more preferably of 150 to 9000 g, even more preferably of 250 to 8000 g, even more preferably of 350 to 7000 g, even more preferably of 400 to 6000 g, yet even more preferably of 450 to 5000 g and most preferably of 500 to 4000 g of choline phosphonate per hectare of land and of 5 to 10000 g, more preferably of 10 to 9000 g, even more preferably of 20 to 8000 g, even more preferably of 25 to 7000 g, even more preferably of 30 to 6000 g, yet even more preferably of 35 to 5500 g and most preferably of 40 to 5000 g of at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols per hectare of land. Said amounts of choline phosphonate and at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols are to be interpreted as amounts of active substance, or in other words, as amounts of 100% active compound. Within said ranges of target dose rates, the composition comprising choline phosphonate and at least one said additional fungicide can be used to control a relatively wide spectrum of fungal infections.

The fungicide composition according to the first aspect of the present invention can be used as such, in the form of its formulations or in the use forms prepared therefrom by further dilution, such as ready-to-use solutions, suspensions, emulsions, powders, pastes and granules. The fungicide composition according to the first aspect of the present invention can be applied in the form of finished formulations. However, the active compounds contained in the fungicide composition can, as individual formulations, also be mixed prior to use, i.e. be applied in the form of tank mixes or a tank mixture.

In a preferred embodiment of the use according to the third aspect of the present invention, said fungicide composition is applied as a tank mixture, wherein choline phosphonate and at least one additional fungicide selected from the group comprising quinone fungicides, succinate dehydrogenase inhibitors, benzamide fungicides, sulphur fungicides, carboxylic acid amide fungicides, demethylation inhibitor fungicides, phenylamide fungicides, copper fungicides, piperidinyl thiazole isoxazoline fungicides and sugar alcohols are combined prior to use.

In a preferred embodiment of the use according to the third aspect of the present invention, said fungicide composition is applied onto a crop, preferably onto a plant surface, more preferably onto a foliar surface. In another embodiment of the present invention, said fungicide composition is applied onto plant seeds. In another embodiment of the present invention, said fungicide composition is applied onto a non-crop areas, such as but not limited to soil where targeted crop grows.

The good fungicidal action of the fungicide composition according to the present invention can be seen from the examples which follow. While the individual active compounds show weaknesses in their fungicidal action, all combinations show a very good action on fungal infections which exceeds a simple sum of actions.

A synergistic effect in fungicides is always present when the fungicidal action of the active compound combination exceeds the action of the active compounds when applied individually.

The expected activity of a given combination of two or three fungicides can be calculated as follows according to a calculation method according to Colby (cf. COLBY, S. R.: "Calculating synergistic and antagonistic responses of herbicide combinations", Weeds 15, pages 20-22, 1967):

If X=% damage by fungicide (A) at an application rate of m g/ha,

Y=% damage by fungicide (B) at an application rate of n g/ha,

E=the expected damage by fungicides (A) and (B) at application rates of m and n kg/ha and, then for a combination:

$$E = X + Y - (X \times Y)/100$$

If the actual damage exceeds the calculated value, the activity of the combination is superadditive, i.e. it shows a synergistic effect. In this case, the damage actually observed must exceed the values calculated using the above formulae for the expected damage E.

EXAMPLES

The invention is further described by the following non-limiting examples which further illustrate the invention, and are not intended, nor should they be interpreted, to limit the scope of the invention.

Examples 1-10

Fungicidal activity of fungicide compositions according to the first aspect of the present invention with regard to different types of fungal infections was determined during trials performed on test fields (field trials). Individual compositions comprising choline phosphonate and individual compositions comprising a defined fungicide selected from the group comprising quinone fungicides, succinate dehydrogenase inhibitors, benzamide fungicides, sulphur fungicides, carboxylic acid amide fungicides and sugar alcohols are compared with a fungicide composition according to the invention comprising both choline phosphonate and said defined fungicide. The expected activity of the combination of the active compounds choline phosphonate and a defined fungicide is calculated according to above mentioned calculation method by Colby, in order to evaluate a synergistic effect between choline phosphonate and a defined fungicide. If the actual fungicidal activity exceeds the calculated value, the activity of the combination is superadditive, i.e. it shows a synergistic effect.

Fungicidal activity was determined by applying fungicide compositions on emerged crops infected by fungal infections on fields where the crops were cultivated. Choline phosphonate and a defined fungicide were applied as a tank mixture by mixing these active compounds prior to use in a spray tank. The corresponding mixture was in the form of a spray liquor. Besides, spray liquors of individual compositions comprising choline phosphonate and of individual compositions comprising a defined fungicide were used. Crops were sprayed with the active compound preparations such that particular desired amounts of active compounds are applied per unit area. Crops were sprayed with multiple applications of the active compound preparations. Spray liquor was diluted with water to arrive at an application volume of 200 to 1000 L/ha. At a specified number of days after a last application (DA-An; with DA referring to "days after" and An referring to a specific application, n being a positive integer), the degree of damage to the fungal infections was assessed.

Example 1 concerns a fungicide composition comprising a combination of choline phosphonate and valifenalate, which was applied on European grapevine (*Vitis vinifera* var. Chardonnay) infected with downy mildew of grapevine (*Plasmopara viticola*), according to the test conditions mentioned above. The results according to Example 1 are shown in Table 1.

TABLE 1

Test results of Example 1, showing fungicidal effect (f.e.) against *Plasmopara viticola* of a fungicide composition according to the first aspect of the present invention comprising choline phosphonate (CP) and valifenalate (VAL), named 'CP + VAL', compared with fungicide compositions comprising CP or VAL individually.

| assessment protocol/ sample size (# of leaves or bunches)/ DA-An*/ growth stage of crop | CP (g a.c.**/ha) | CP f.e. (%) | VAL (g a.c./ha) | VAL f.e. (%) | CP + VAL (g a.c. CP†/ha + g a.c. VAL‡/ha) | CP + VAL f.e. (%) | Colby f.e.(%) |
|---|---|---|---|---|---|---|---|
| PESSEV/ 100 leaves/ 14 DA-A3/ BBCH 77 | 1620 | 83.8 | 120 | 66.9 | 1200† + 120‡ | 99.7 | 94.6 |
| PESSEV/ 50 bunches/ 14 DA-A3/ BBCH 77 | 1620 | 34.1 | 120 | 75.9 | 1200† + 120‡ | 93.7 | 84.1 |
| PESSEV/ 50 bunches/ 14 DA-A5/ BBCH 83 | 1620 | 32.5 | 120 | 73.3 | 1200† + 120‡ | 91.4 | 82.0 |
| PESINC/ 100 leaves/ 14 DA-A3/ BBCH 77 | 1620 | 74.5 | 120 | 57.6 | 1200† + 120‡ | 91.5 | 89.2 |
| PESINC/ 50 bunches/ 14 DA-A3/ BBCH 77 | 1620 | 7.2 | 120 | 64.0 | 1200† + 120‡ | 86.5 | 66.6 |
| PESINC/ 50 bunches/ 14 DA-A5/ BBCH 83 | 1620 | 8.2 | 120 | 53.6 | 1200† + 120‡ | 80.9 | 57.4 |

The fungicide composition was applied to *Vitis vinifera* var. Chardonnay (the crop) infected with *Plasmopara viticola*.

Shown data are average values of f.e. observed for 100 leaves of *Vitis vinifera* var. Chardonnay or 50 bunches of *Vitis vinifera* var. Chardonnay.

Fungicidal effect f.e. was evaluated according to two different assessment protocols: (i) 100 leaves per plot of uniform age, or the leaves of 50 bunches, were inspected both on upper and lower sides for infection with *Plasmopara viticola*, with the number of leaves infected expressed as percentage (PESINC), and (ii) 100 leaves per plot, or the leaves of 50 bunches, of uniform age were inspected both on upper and lower sides for infection with *Plasmopara viticola*, with the foliar surface of leaves infected expressed as percentage (PESSEV).

Synergistic effect of 'CP + VAL' is evaluated by comparison against the expected f.e. of the combination of the active compounds calculated according to the calculation method by Colby given above.

Tests were conducted in South Africa and the crops were sprayed with multiple applications of the active compound preparations, according to the following scheme: A1 (first application), A2 = A1 + 14 days, A3 = A2 + 13 days, A4 = A3 + 14 days, and A5 = A4 + 11 days.

*DA-An = days after last application (with DA referring to "days after" and An referring to a specific application, n being a positive integer);

**a.c. = active compound

Example 2 concerns a fungicide composition comprising a combination of choline phosphonate and valifenalate, which was applied on cucumber (*Cucumis sativus*) infected with downy mildew of cucumber (*Peronospora cumensis*), according to the test conditions mentioned above. The results according to Example 2 are shown in Table 2.

TABLE 2

Test results of Example 2, showing fungicidal effect (f.e.) against *Peronospora cumensis* of a fungicide composition according to the first aspect of the present invention comprising choline phosphonate (CP) and valifenalate (VAL), named 'CP + VAL', compared with fungicide compositions comprising CP or VAL individually.

| assessment protocol/ DA-An*/ growth stage of crop | CP (g a.c.**/ha) | CP f.e. (%) | VAL (g a.c./ha) | VAL f.e. (%) | CP + VAL (g a.c. CP†/ha + g a.c. VAL‡/ha) | CP + VAL f.e. (%) | Colby f.e.(%) |
|---|---|---|---|---|---|---|---|
| PESSEV/ 7 DA-A1/ BBCH 16 | 1500 | 78.1 | 150 | 43.6 | 1500† + 150‡ | 96.3 | 87.7 |
| PESSEV/ 6 DA-A2/ BBCH 19 | 1500 | 63.8 | 150 | 31.7 | 1500† + 150‡ | 88.3 | 75.3 |
| PESSEV/ 8 DA-A3/ BBCH 19 | 1500 | 63.9 | 150 | 31.7 | 1500† + 150‡ | 88.3 | 75.3 |
| PESSEV/ 7 DA-A4/ BBCH 19 | 1500 | 73.8 | 150 | 62.1 | 1500† + 150‡ | 96.6 | 90.1 |
| PESSEV/ 14 DA-A4/ BBCH 19 | 1500 | 60.1 | 150 | 27.0 | 1500† + 150‡ | 85.8 | 70.9 |

The fungicide composition was applied to *Cucumis sativus* (the crop) infected with *Peronospora cumensis*.
Shown data are average values of f.e. observed for 20 leaves of one plot.
Fungicidal effect f.e. was evaluated according to the following assessment protocols: crops of uniform age were inspected for infection with *Peronospora cumensis*, with the surface of crops infected expressed as percentage (PESSEV).
Synergistic effect of 'CP + VAL' is evaluated by comparison against the expected f.e. of the combination of the active compounds calculated according to the calculation method by Colby given above.
Tests were conducted in France and the crops were sprayed with multiple applications of the active compound preparations, according to the following scheme: A1 (first application), A2 = A1 + 7 days, A3 = A2 + 7 days, and A4 = A3 + 8 days.
*DA-An = days after last application (with DA referring to "days after" and An referring to a specific application, n being a positive integer);
**a.c. = active compound Example 3 concerns a fungicide composition comprising a combination of choline phosphonate and sulphur, which was applied on cucumber (*Cucumis sativus* var. Bosco) crops infected with powdery mildew of bean (*Sphaerotheca fuliginea*), according to the test conditions mentioned above. The results according to Example 3 are shown in Table 3.

TABLE 3

Test results of Example 3, showing fungicidal effect (f.e.) against *Sphaerotheca fuliginea* of a fungicide composition according to the first aspect of the present invention comprising choline phosphonate (CP) and sulphur (S), named 'CP + S', compared with fungicide compositions comprising CP or S individually.

| assessment protocol/ DA-An*/ growth stage of crop | CP (g a.c.**/ha) | CP f.e. (%) | S (g a.c./ha) | S f.e. (%) | CP + S (g a.c. CP†/ha + g a.c. S‡/ha) | CP + S f.e. (%) | Colby f.e. (%) |
|---|---|---|---|---|---|---|---|
| PESSEV/ 7 DA-A2/ BBCH 73 | 3500 | 92.5 | 2080 | 96.7 | 1500† + 2000‡ | 100 | 99.8 |
| PESINC/ 7 DA-A2/ BBCH 73 | 3500 | 74.3 | 2080 | 88.1 | 1500† + 2000‡ | 100 | 96.9 |
| PESSEV curative/ 7 DA-A2/ BBCH 73 | 3500 | 88.6 | 2080 | 93.6 | 1500† + 2000‡ | 100 | 99.3 |
| PESINC curative/ 7 DA-A2/ BBCH 73 | 3500 | 77.1 | 2080 | 85.1 | 1500† + 2000‡ | 100 | 96.6 |
| PESINC/ 7 DA-A3/ BBCH 76 | 3500 | 78.8 | 2080 | 95 | 1500† + 2000‡ | 100 | 98.9 |
| PESSEV curative/ 7 DA-A3/ BBCH 76 | 3500 | 89.4 | 2080 | 96 | 1500† + 2000‡ | 100 | 99.6 |

TABLE 3-continued

Test results of Example 3, showing fungicidal effect (f.e.) against *Sphaerotheca fuliginea* of a fungicide composition according to the first aspect of the present invention comprising choline phosphonate (CP) and sulphur (S), named 'CP + S', compared with fungicide compositions comprising CP or S individually.

| assessment protocol/ DA-An*/ growth stage of crop | CP (g a.c.**/ha) | CP f.e. (%) | S (g a.c./ha) | S f.e. (%) | CP + S (g a.c. CP†/ha + g a.c. S‡/ha) | CP + S f.e. (%) | Colby f.e. (%) |
|---|---|---|---|---|---|---|---|
| PESINC curative/ 7 DA-A3/ BBCH 76 | 3500 | 71.7 | 2080 | 87.5 | 1500† + 2000‡ | 100 | 96.5 |
| PESSEV/ 7 DA-A4/ BBCH 77 | 3500 | 91.7 | 2080 | 97.6 | 1500† + 2000‡ | 100 | 99.8 |
| PESINC/ 7 DA-A4/ BBCH 77 | 3500 | 70.0 | 2080 | 85.0 | 1500† + 2000‡ | 100 | 95.5 |
| PESSEV curative/ 7 DA-A4/ BBCH 77 | 3500 | 89.9 | 2080 | 95 | 1500† + 2000‡ | 100 | 99.5 |
| PESINC curative/ 7 DA-A4/ BBCH 77 | 3500 | 60 | 2080 | 77.5 | 1500† + 2000‡ | 100 | 91.0 |
| PESSEV/ 14 DA-A4/ BBCH 78 | 3500 | 89.0 | 2080 | 96.3 | 1500† + 2000‡ | 100 | 99.6 |
| PESINC/ 14 DA-A4/ BBCH 78 | 3500 | 59.5 | 2080 | 75.2 | 1500† + 2000‡ | 100 | 90.0 |
| PESSEV curative/ 14 DA-A4/ BBCH 78 | 3500 | 91.2 | 2080 | 93.4 | 1500† + 2000‡ | 100 | 99.4 |
| PESINC curative/ 14 DA-A4/ BBCH 78 | 3500 | 38.6 | 2080 | 58.9 | 1500† + 2000‡ | 100 | 74.8 |
| PESSEV/ 21 DA-A4/ BBCH 79 | 3500 | 93.4 | 2080 | 96.9 | 1500† + 2000‡ | 100 | 99.8 |
| PESINC/ 21 DA-A4/ BBCH 79 | 3500 | 55.7 | 2080 | 69.7 | 1500† + 2000‡ | 100 | 86.6 |

Fungicidal effect f.e. was evaluated according to four different assessment protocols: (i) per plot, 20 leaves of uniform age were inspected both on upper and lower sides for infection with *Sphaerotheca fuliginea*, with the number of leaves infected expressed as percentage (PESINC), (ii) per plot, 20 leaves of uniform age were inspected both on upper and lower sides for infection with *Sphaerotheca fuliginea*, with the foliar surface of leaves infected expressed as percentage (PESSEV), (iii) 2 leaves on 5 plants were marked and were analyzed again at a successive assessment, the leaves being inspected both on upper and lower sides for infection with *Sphaerotheca fuliginea*, with the number of leaves infected expressed as percentage (PESINC curative), (iv) 2 leaves on 5 plants were marked and were analyzed again at a successive assessment, the leaves being inspected both on upper and lower sides for infection with *Sphaerotheca fuliginea*, with the foliar surface of leaves infected expressed as percentage (PESSEV curative).

For each protocol, results were compared with respect to an untreated check.

Synergistic effect of 'CP + S' is evaluated by comparison against the expected f.e. of the combination of the individual active compounds calculated according to the calculation method by Colby given above.

Tests were conducted in Italy and the crops were sprayed with multiple applications of the active compound preparations, according to the following scheme: A1 (first application), A2 = A1 + 7 days, A3 = A2 + 7 days, and A4 = A3 + 7 days.

*DA-An = days after last application (with DA referring to "days after" and An referring to a specific application, n being a positive integer);

**a.c. = active compound

Example 4 concerns a fungicide composition comprising a combination of choline phosphonate and dithianon, which was applied on apple (*Malus domestica* var. Golden delicious) crops infected with scab of apple (*Venturia inaequalis*), according to the test conditions mentioned above. The results according to Example 4 are shown in Table 4.

TABLE 4

Test results of Example 4, showing fungicidal effect (f.e.) against *Venturia inaequalis* of a fungicide composition according to the first aspect of the present invention comprising choline phosphonate (CP) and dithianon (DIT), named 'CP + DIT', compared with fungicide compositions comprising CP or DIT individually.

| assessment protocol/ test location/ DA-An*/ growth stage of crop | CP (g a.c.**/ha) | CP f.e. (%) | DIT (g a.c./ha) | DIT f.e. (%) | CP + DIT (g a.c. CP†/ha + g a.c. DIT‡/ha) | CP + DIT f.e. (%) | Colby f.e. (%) |
|---|---|---|---|---|---|---|---|
| PESSEV/ location 1/ 6 DA-A4/ BBCH 72 | 1950 | 32.7 | 250 | 75.4 | 1950† + 250‡ | 92.2 | 83.5 |
| PESSEV/ location 1/ 1 DA-A6/ BBCH 74 | 1950 | 35.7 | 250 | 63.0 | 1950† + 250‡ | 84.6 | 76.2 |
| PESINC/ location 1/ 6 DA-A4/ BBCH 72 | 1950 | 12.5 | 250 | 38.6 | 1950† + 250‡ | 72.0 | 46.3 |
| PESINC/ location 1/ 1 DA-A6/ BBCH 74 | 1950 | 7.4 | 250 | 19.8 | 1950† + 250‡ | 56.3 | 25.7 |
| PESINC/ location 2/ 5 DA-A8/ BBCH 74 | 1950 | 61.0 | 250 | 59.0 | 1950† + 250‡ | 91.0 | 84.0 |
| PESINC/ location 3/ 31 DA-A9/ BBCH 73 | 1950 | 41.1 | 250 | 51.8 | 1950† + 250‡ | 89.7 | 71.6 |
| PESINC/ location 3/ 80 DA-A9/ BBCH 73 | 1950 | 31.7 | 250 | 42.6 | 1950† + 250‡ | 85.7 | 60.8 |

The fungicide composition was applied to *Malus domestica* var. Golden delicious (the crop) infected with *Venturia inaequalis*.
Tests were conducted in three different locations, being France, the United Kingdom and Belgium, hereinafter referred to as locations 1-3, respectively.
Fungicidal effect f.e. was evaluated according to two different assessment protocols: (i) 200 leaves per plot of uniform age were inspected both on upper and lower sides for infection with *Venturia inaequalis*, with the number of leaves infected expressed as percentage (PESINC), and (ii) 200 leaves per plot of uniform age were inspected both on upper and lower sides for infection with *Venturia inaequalis*, with the foliar surface of leaves infected expressed as percentage (PESSEV). For each protocol, results were compared with respect to an untreated check.
Synergistic effect of 'CP + DIT' is evaluated by comparison against the expected f.e. of the combination of the individual active compounds calculated according to the calculation method by Colby given above.
Crops were sprayed with multiple applications of the active compound preparations, according to the following schemes for location 1: A1 (first application), A2 = A1 + 11 days, A3 = A2 + 12 days, and A4 = A3 + 9 days, A5 = A4 + 11 days, A6 = A5 + 10 days, A7 = A6 + 12 days; location 2: A1 (first application), A2 = A1 + 9 days, A3 = A2 + 8 days, and A4 = A3 + 7 days, A5 = A4 + 11 days, A6 = A5 + 11 days, A7 = A6 + 10 days, A8 = A7 + 17 days, A9 = A8 + 13 days; and location 3: A1 (first application), A2 = A1 + 7 days, A3 = A2 + 10 days, and A4 = A3 + 8 days, A5 = A4 + 7 days, A6 = A5 + 10 days, A7 = A6 + 8 days, A8 = A7 + 29 days, A9 = A8 + 9 days.
*DA-An = days after last application (with DA referring to "days after" and An referring to a specific application, n being a positive integer);
**a.c. = active compound Example 5 concerns a fungicide composition comprising a combination of choline phosphonate and isofetamid, which was applied on apple (*Malus domestica* var. Golden delicious) crops infected with scab of apple (*Venturia inaequalis*), according to the test conditions mentioned above. The results according to Example 5 are shown in Table 5.

TABLE 5

Test results of Example 5, showing fungicidal effect (f.e.) against *Venturia inaequalis* of a fungicide composition according to the first aspect of the present invention comprising choline phosphonate (CP) and isofetamid (ISO), named 'CP + ISO', compared with fungicide compositions comprising CP or ISO individually.

| assessment protocol/ test location/ DA-An*/ growth stage of crop | CP (g a.c.**/ha) | CP f.e. (%) | ISO (g a.c./ha) | ISO f.e. (%) | CP + ISO (g a.c. CP†/ha + g a.c. ISO‡/ha) | CP + ISO f.e. (%) | Colby f.e. (%) |
|---|---|---|---|---|---|---|---|
| PESINC/ location 1/ 6 DA-A4/ BBCH 72 | 1950 | 10.0 | 60 | 13.3 | 1950† + 60‡ | 23.1 | 21.9 |
| PESSEV/ location 2/ 7 DA-A6/ BBCH 72 | 1950 | 81.7 | 60 | 32.9 | 1950† + 60‡ | 88.2 | 87.7 |
| PESSEV/ location 2/ 6 DA-A9/ BBCH 74 | 1950 | 66.6 | 60 | 25.3 | 1950† + 60‡ | 82.7 | 75.1 |
| PESSEV/ location 2/ 4 DA-A11/ BBCH 75 | 1950 | 65.6 | 60 | 22.6 | 1950† + 60‡ | 79.7 | 73.3 |
| PESSEV/ location 2/ 6 DA-A13/ BBCH 77 | 1950 | 57.8 | 60 | 27.7 | 1950† + 60‡ | 64.4 | 69.5 |
| PESINC/ location 2/ 7 DA-A6/ BBCH 72 | 1950 | 45.7 | 60 | 16.8 | 1950† + 60‡ | 59.5 | 54.8 |
| PESINC/ location 2/ 6 DA-A9/ BBCH 74 | 1950 | 50.7 | 60 | 12.1 | 1950† + 60‡ | 65.2 | 56.7 |
| PESINC/ location 2/ 4 DA-A11/ BBCH 75 | 1950 | 29.3 | 60 | 4.1 | 1950† + 60‡ | 46.2 | 32.1 |
| PESINC/ location 2/ 6 DA-A13/ BBCH 77 | 1950 | 19.7 | 60 | 5.5 | 1950† + 60‡ | 25.3 | 24.1 |
| PESINC/ location 3/ 31 DA-A9/ BBCH 73 | 1950 | 41.1 | 60 | 8.7 | 1950† + 60‡ | 54.8 | 46.2 |
| PESINC/ location 3/ 80 DA-A9/ BBCH 73 | 1950 | 31.7 | 60 | 2.2 | 1950† + 60‡ | 45.1 | 33.2 |

The fungicide composition was applied to *Malus domestica* var. Golden delicious (the crop) infected with *Venturia inaequalis*.
Tests were conducted in three different locations, being France, Italy and Belgium, hereinafter referred to as locations 1-3, respectively.
Fungicidal effect f.e. was evaluated according to two different assessment protocols: (i) 200 leaves per plot of uniform age were inspected both on upper and lower sides for infection with *Venturia inaequalis*, with the number of leaves infected expressed as percentage (PESINC), and (ii) 200 leaves per plot of uniform age were inspected both on upper and lower sides for infection with *Venturia inaequalis*, with the foliar surface of leaves infected expressed as percentage (PESSEV). For each protocol, results were compared with respect to an untreated check.
Synergistic effect of 'CP + ISO' is evaluated by comparison against the expected f.e. of the combination of the individual active compounds calculated according to the calculation method by Colby given above.
Crops were sprayed with multiple applications of the active compound preparations, according to the following schemes for location 1: A1 (first application), A2 = A1 + 11 days, A3 = A2 + 12 days, and A4 = A3 + 9 days, A5 = A4 + 11 days, A6 = A5 + 10 days, A7 = A6 + 12 days; location 2: A1 (first application), A2 = A1 + 8 days, A3 = A2 + 8 days, and A4 = A3 + 8 days, A5 = A4 + 8 days, A6 = A5 + 7 days, A7 = A6 + 7 days, A8 = A7 + 9 days, A9 = A8 + 8 days, A10 = A9 + 9 days, A11 = A10 + 8 days, A12 = A11 + 7 days, A13 = A12 + 7 days; and location 3: A1 (first application), A2 = A1 + 7 days, A3 = A2 + 10 days, and A4 = A3 + 8 days, A5 = A4 + 7 days, A6 = A5 + 10 days, A7 = A6 + 8 days, A8 = A7 + 29 days, A9 = A8 + 9 days.
*DA-An = days after last application (with DA referring to "days after" and An referring to a specific application, n being a positive integer);
**a.c. = active compound Example 6 concerns a fungicide composition comprising a combination of choline phosphonate and zoxamid, which was applied on European grapevine (*Vitis vinifera*) infected with downy mildew of grapevine (*Plasmopara viticola*), according to the test conditions mentioned above. The results according to Example 6 are shown in Table 6.

TABLE 6

Test results of Example 6, showing fungicidal effect (f.e.) against *Plasmopara viticola* of a fungicide composition according to the first aspect of the present invention comprising choline phosphonate (CP) and zoxamid (ZOX), named 'CP + ZOX', compared with fungicide compositions comprising CP or ZOX individually.

| assessment protocol/ test location/ sample size/ DA-An*/ growth stage of crop | CP (g a.c.**/ha) | CP f.e. (%) | ZOX (g a.c./ha) | ZOX f.e. (%) | CP + ZOX (g a.c. CP†/ha + g a.c. ZOX‡/ha) | CP + ZOX f.e. (%) | Colby f.e. (%) |
|---|---|---|---|---|---|---|---|
| PESSEV/ location 1/ 50 bunches/ 1 DA-A8/ BBCH 75 | 3250 | 30.0 | 120 | 75.2 | 3250† + 120‡ | 85.9 | 82.6 |
| PESSEV/ location 1/ 50 bunches/ 16 DA-A9/ BBCH 81 | 3250 | 19.2 | 120 | 51.7 | 3250† + 120‡ | 69.4 | 60.9 |
| PESINC/ location 1/ 50 bunches/ 1 DA-A6/ BBCH 69 | 3250 | 32.5 | 120 | 73.0 | 3250† + 120‡ | 88.0 | 81.8 |
| PESINC/ location 1/ 50 bunches/ 1 DA-A8/ BBCH 75 | 3250 | 6.0 | 120 | 18.0 | 3250† + 120‡ | 23.0 | 22.9 |
| PESINC/ location 1/ 50 bunches/ 16 DA-A9/ BBCH 81 | 3250 | 0.0 | 120 | 1.0 | 3250† + 120‡ | 10.0 | 1.0 |
| PESSEV/ location 2/ 100 leaves/ 9 DA-A4/ BBCH 71 | 3250 | 57.8 | 120 | 67.7 | 3250† + 120‡ | 90.7 | 86.4 |
| PESSEV/ location 2/ 100 leaves/ 6 DA-A5/ BBCH 77 | 3250 | 21.4 | 120 | 15.1 | 3250† + 120‡ | 71.2 | 33.3 |
| PESINC/ location 2/ 100 leaves/ 9 DA-A4/ BBCH 71 | 3250 | 0.8 | 120 | 22.8 | 3250† + 120‡ | 40.2 | 23.3 |
| PESINC/ location 2/ 100 leaves/ 6 DA-A5/ BBCH 77 | 3250 | 0.0 | 120 | 0.0 | 3250† + 120‡ | 2.0 | 0.0 |
| PESSEV/ location 2/ 50 bunches/ 9 DA-A4/ BBCH 71 | 3250 | 4.5 | 120 | 81.3 | 3250† + 120‡ | 93.3 | 82.1 |
| PESSEV/ location 2/ 50 bunches/ 8 DA-A5/ BBCH 77 | 3250 | 0.4 | 120 | 21.4 | 3250† + 120‡ | 61.8 | 21.7 |
| PESSEV/ location 2/ 50 bunches/ 9 DA-A6/ BBCH 79 | 3250 | 0.0 | 120 | 1.3 | 3250† + 120‡ | 17.9 | 1.3 |
| PESINC/ location 2/ 50 bunches/ 9 DA-A4/ BBCH 71 | 3250 | 0.0 | 120 | 10.0 | 3250† + 120‡ | 27.0 | 10.0 |

TABLE 6-continued

Test results of Example 6, showing fungicidal effect (f.e.) against *Plasmopara viticola* of a fungicide composition according to the first aspect of the present invention comprising choline phosphonate (CP) and zoxamid (ZOX), named 'CP + ZOX', compared with fungicide compositions comprising CP or ZOX individually.

| assessment protocol/ test location/ sample size/ DA-An*/ growth stage of crop | CP (g a.c.**/ha) | CP f.e. (%) | ZOX (g a.c./ha) | ZOX f.e. (%) | CP + ZOX (g a.c. CP†/ha + g a.c. ZOX‡/ha) | CP + ZOX f.e. (%) | Colby f.e. (%) |
|---|---|---|---|---|---|---|---|
| PESINC/ location 2/ 50 bunches/ 9 DA-A4/ BBCH 77 | 3250 | 0.0 | 120 | 0.0 | 3250† + 120‡ | 0.5 | 0.0 |
| PESSEV/ location 3/ 100 leaves/ 13 DA-A6/ BBCH 83 | 3250 | 25.9 | 120 | 52.1 | 3250† + 120‡ | 69.4 | 64.5 |
| PESINC/ location 3/ 100 leaves/ 13 DA-A6/ BBCH 83 | 3250 | 0.3 | 120 | 18.7 | 3250† + 120‡ | 27.4 | 18.9 |
| PESINC/ location 3/ 100 leaves/ 7 DA-A8/ BBCH 83 | 3250 | 0.0 | 120 | 16.0 | 3250† + 120‡ | 24.8 | 16.0 |
| PESSEV/ location 3/ 50 bunches/ 11 DA-A4/ BBCH 75 | 3250 | 66.5 | 120 | 80.2 | 3250† + 120‡ | 100.0 | 93.4 |
| PESSEV/ location 3/ 50 bunches/ 13 DA-A6/ BBCH 83 | 3250 | 14.4 | 120 | 49.2 | 3250† + 120‡ | 56.8 | 56.5 |
| PESSEV/ location 3/ 50 bunches/ 7 DA-A8/ BBCH 83 | 3250 | 8.7 | 120 | 48.9 | 3250† + 120‡ | 53.5 | 53.3 |
| PESINC/ location 3/ 50 bunches/ 11 DA-A4/ BBCH 75 | 3250 | 55.5 | 120 | 48.8 | 3250† + 120‡ | 100 | 77.2 |

The fungicide composition was applied to Vitis vinifera (the crop) infected with *Plasmopara viticola*.

Tests were conducted in three different locations, two different locations in France and one location in Germany, hereinafter referred to as locations 1-3, respectively.

For location 1, the crop was of the variety Negrette.

For location 2, the crop was of the variety Grenache.

For location 3, the crop was of the variety Mueller-Thurgau.

Fungicidal effect f.e. was evaluated according to two different assessment protocols: (i) 100 leaves per plot, or the leaves of 50 bunches, of uniform age were inspected both on upper and lower sides for infection with *Plasmopara viticola*, with the number of leaves infected expressed as percentage (PESINC), and (ii) 100 leaves, or the leaves of 50 bunches, per plot of uniform age were inspected both on upper and lower sides for infection with *Plasmopara viticola*, with the foliar surface of leaves infected expressed as percentage (PESSEV).

For each protocol, results were compared with respect to an untreated check.

Synergistic effect of 'CP + ZOX' is evaluated by comparison against the expected f.e. of the combination of the individual active compounds calculated according to the calculation method by Colby given above.

Crops were sprayed with multiple applications of the active compound preparations, according to the following schemes for location 1: A1 (first application), A2 = A1 + 13 days, A3 = A2 + 10 days, and A4 = A3 + 7 days, A5 = A4 + 6 days, A6 = A5 + 7 days, A7 = A6 + 11 days, A8 = A7 + 8 days, A9 = A8 + 14 days; location 2: A1 (first application), A2 = A1 + 13 days, A3 = A2 + 10 days, and A4 = A3 + 12 days, A5 = A4 + 14 days, A6 = A5 + 13 days; and location 3: A1 (first application), A2 = A1 + 12 days, A3 = A2 + 11 days, and A4 = A3 + 14 days, A5 = A4 + 11 days, A6 = A5 + 10 days, A7 = A6 + 13 days, A8 = A7 + 14 days.

*DA-An = days after last application (with DA referring to "days after" and An referring to a specific application, n being a positive integer);

**a.c. = active compound

Example 7 concerns a fungicide composition comprising a combination of choline phosphonate and fluopicolide, which was applied on European grapevine (*Vitis vinifera* var. Merlot) infected with downy mildew of grapevine (*Plasmopara viticola*), according to the test conditions mentioned above. The results according to Example 7 are shown in Table 7.

TABLE 7

Test results of Example 7, showing fungicidal effect (f.e.) against *Plasmopara viticola* of a fungicide composition according to the first aspect of the present invention comprising choline phosphonate (CP) and fluopicolide (FLU), named 'CP + FLU', compared with fungicide compositions comprising CP or FLU individually.

| assessment protocol/ sample size/ DA-An*/ growth stage of crop | CP (g a.c.**/ha) | CP f.e. (%) | FLU (g a.c./ha) | FLU f.e. (%) | CP + FLU (g a.c. CP†/ha + g a.c. FLU‡/ha) | CP + FLU f.e. (%) | Colby f.e. (%) |
|---|---|---|---|---|---|---|---|
| PESINC/ 100 leaves/ 0 DA-A3/ BBCH 73 | 3250 | 59.2 | 130 | 62.3 | 3250† + 130‡ | 86.7 | 84.6 |
| PESINC/ 100 leaves/ 0 DA-A5/ BBCH 77 | 3250 | 23.5 | 130 | 47.8 | 3250† + 130‡ | 76.0 | 60.1 |
| PESINC/ 100 leaves/ 9 DA-A6/ BBCH 83 | 3250 | 16.2 | 130 | 32.2 | 3250† + 130‡ | 56.7 | 43.2 |
| PESSEV/ 50 bunches/ 0 DA-A5/ BBCH 77 | 3250 | 54.9 | 130 | 83.6 | 3250† + 130‡ | 96.7 | 92.6 |
| PESSEV/ 50 bunches/ 9 DA-A6/ BBCH 83 | 3250 | 26.5 | 130 | 46.8 | 3250† + 130‡ | 85.8 | 60.9 |
| PESINC/ 50 bunches/ 0 DA-A3/ BBCH 73 | 3250 | 50.6 | 130 | 84.4 | 3250† + 130‡ | 94.5 | 92.3 |
| PESINC/ 50 bunches/ 0 DA-A5/ BBCH 77 | 3250 | 12.0 | 130 | 37.5 | 3250† + 130‡ | 75.0 | 45.0 |
| PESINC/ 50 bunches/ 9 DA-A6/ BBCH 83 | 3250 | 10.0 | 130 | 14.5 | 3250† + 130‡ | 53.5 | 23.1 |

The fungicide composition was applied to *Vitis vinifera* var. Merlot (the crop) infected with *Plasmopara viticola*.
Fungicidal effect f.e. was evaluated according to two different assessment protocols: (i) 100 leaves per plot, or the leaves of 50 bunches per plot, of uniform age were inspected both on upper and lower sides for infection with *Plasmopara viticola*, with the number of leaves infected expressed as percentage (PESINC), and (ii) 100 leaves per plot, or the leaves of 50 bunches per plot, of uniform age were inspected both on upper and lower sides for infection with *Plasmopara viticola*, with the foliar surface of leaves infected expressed as percentage (PESSEV).
For each protocol, results were compared with respect to an untreated check. Synergistic effect of 'CP + FLU' is evaluated by comparison against the expected f.e. of the combination of the individual active compounds calculated according to the calculation method by Colby given above.
Tests were conducted on a field in France and the crops were sprayed with multiple applications of the active compound preparations, according to the following scheme: A1 (first application), A2 = A1 + 11 days, A3 = A2 + 10 days, A4 = A3 + 11 days, A5 = A4 + 14 days, and A6 = A5 + 14 days.
*DA-An = days after last application (with DA referring to "days after" and An referring to a specific application, n being a positive integer);
**a.c. = active compound Example 8 concerns a fungicide composition comprising a combination of choline phosphonate and tagatose, which was applied on cucumber (*Cucumis sativus*) crops infected with powdery mildew of bean (*Sphaerotheca fuliginea*), according to the test conditions mentioned above. The results according to Example 8 are shown in Table 8.

TABLE 8

Test results of Example 8, showing fungicidal effect (f.e.) against *Sphaerotheca fuliginea* of a fungicide composition according to the first aspect of the present invention comprising choline phosphonate (CP) and tagatose (TAG), named 'CP + TAG', compared with fungicide compositions comprising CP or TAG individually.

| assessment protocol/ DA-An*/ growth stage of crop | CP (g a.c.**/ha) | CP f.e. (%) | TAG (g a.c./ha) | TAG f.e. (%) | CP + TAG (g a.c. CP†/ha + g a.c. TAG‡/ha) | CP + TAG f.e. (%) | Colby f.e. (%) |
|---|---|---|---|---|---|---|---|
| PESSEV/ 7 DA-A3/ BBCH 63 | 430 | 90.8 | 500 | 93.2 | 430† + 500‡ | 100.0 | 99.4 |
| PESINC/ 7 DA-A3/ BBCH 63 | 430 | 80.6 | 500 | 83.9 | 430† + 500‡ | 100.0 | 96.9 |

The fungicide composition was applied to *Cucumis sativus* (the crop) infected with *Sphaerotheca fuliginea*.
Fungicidal effect f.e. was evaluated according to the following assessment protocols: (i) leaves of uniform age on a plot were inspected for infection with *Sphaerotheca fuliginea*, with the number of leaves infected expressed as percentage (PESINC), and (ii) leaves of uniform age on a plot were inspected both on upper and lower sides for infection with *Plasmopara viticola*, with the foliar surface of leaves infected expressed as percentage (PESSEV).
Results were compared with respect to an untreated check. Synergistic effect of 'CP + TAG' is evaluated by comparison against the expected f.e. of the combination of the individual active compounds calculated according to the calculation method by Colby given above.
Tests were conducted on a field in Spain and the crops were sprayed with multiple applications of the active compound preparations, according to the following scheme: A1 (first application), A2 = A1 + 7 days, A3 = A2 + 7 days, A4 = A3 + 7 days, A5 = A4 + 7 days.
*DA-An = days after last application (with DA referring to "days after" and An referring to a specific application, n being a positive integer);
**a.c. = active compound Synergistic actions are observed for the fungicide combinations of Examples 1-8, as shown in Tables 1-8. When taking into account the observed synergistic actions, the environmental loading will be less when applying tank mixtures of choline phosphonate and at least one additional fungicide selected from the group comprising quinone fungicides, succinate dehydrogenase inhibitors, benzamide fungicides, sulphur fungicides, carboxylic acid amide fungicides and sugar alcohols compared to applying individual compositions comprising only one of said fungicides.

Example 9

Table 9 shows a composition of a suspension concentrate fungicide composition, according to the first aspect of the invention, comprising choline phosphonate, valifenalate, a dispersing agent, an antifoam agent, a preservative, a spreading agent, a viscosity modifier and water. The composition as shown in Table 9 is a suspension concentrate with excellent formulation stability and good physical spray performance.

TABLE 9

Suspension concentrate fungicide composition according to the first aspect of the present invention comprising choline phosphonate and valifenalate, wherein the amounts of all components are shown in weight percentages

| | Weight percentage (% by weight) |
|---|---|
| choline phosphonate | 36-42 |
| valifenalate | 1-5 |
| dispersing agent | 1-5 |
| antifoam agent | 0.01-0.3 |
| preservative | 0.01-0.2 |
| spreading agent | 1-5 |
| viscosity modifier | 0.1-0.5 |
| water | 49-55 |
| Total | 100 |

Example 10

Tables 10 show a composition of a suspension concentrate fungicide composition, according to the first aspect of the invention, comprising choline phosphonate, sulfur, a dispersing agent, a wetting agent, a freezing point depressant, an antifoam agent, a preservative, a chemical stabilizer, a viscosity modifier and water. The composition as shown in Tables 10 is a suspension concentrate with excellent formulation stability and good physical spray performance.

TABLE 10

Suspension concentrate fungicide composition according to the first aspect of the present invention comprising choline phosphonate and sulphur, wherein the amounts of all components are shown in weight percentages.

| | Weight percentage (% by weight) | | |
|---|---|---|---|
| | Sample 1 | Sample 2 | Sample 3 |
| choline phosphonate | 31-38 | 22-28 | 43-50 |
| sulphur | 24-32 | 32-38 | 18-25 |
| dispersing agent | 0.5-5 | 0.5-5 | 0.5-3 |
| wetting agent | 0.1-2 | 0.1-2 | 0.1-1.5 |
| freezing point depressant | 0.5-4 | 0.5-4 | 0.5-3 |
| antifoam agent | 0.01-0.3 | 0.01-0.3 | 0.01-0.15 |
| preservative | 0.01-0.2 | 0.01-0.2 | 0.01-0.1 |
| chemical stabilizer | 0.01-0.3 | 0.01-0.3 | 0.01-0.3 |
| viscosity modifier | 0.1-0.5 | 0.1-0.5 | 0.1-0.4 |
| water | 28-36 | 30-36 | 24-32 |
| Total | 100 | 100 | 100 |

Example 11

Example 11 concerns a fungicide composition comprising a combination of choline phosphonate and cuprous oxide, which was applied on potato (*Solanum tuberosum* L. var. Bintje) infected with potato late blight (*Phytophthora infestans*). Potato plants were grown in pots until they had a height of 30 cm. Subsequently, these potted potato plants were sprayed with spray liquors comprising a mixture of active fungicide compounds or with spray liquors comprising one of the active fungicide compounds. This spraying with spray liquors is defined as the first application of active fungicide compounds. At one day after the first application, top and bottom sides of potato leaves were infected with *Phytophthora infestans* in a concentration of 5000 spores/ml. At seven days after the first application, a second application of said spray liquors was performed. For both applications, spray liquor was diluted with water to arrive at an application volume of 218 L/ha. At fourteen days after the second application, the degree of damage to the potato plants due to the *Phytophthora infestans* infection was assessed. In the assessment, the total amount of potato leaves and the amount of infected potato leaves was counted. Even when the smallest lesion was observed, a leaf was counted as infected. The results according to Example 11 are shown in Table 11.

TABLE 11

Test results of Example 11, showing fungicidal effect (f.e.) against *Phytophthora infestans* of a fungicide composition according to the first aspect of the present invention comprising choline phosphonate (CP) and cuprous oxide (CUP), named 'CP + CUP', compared with fungicide compositions comprising CP or CUP individually.

| assessment protocol/ DA-An* | CP (g a.c.**/ha) | CP f.e. (%) | CUP (g a.c./ha) | CUP f.e. (%) | CP + CUP (g a.c. CP$^\dagger$/ha + g a.c. CUP$^\ddagger$/ha) | CP + CUP f.e. (%) | Colby f.e. (%) |
|---|---|---|---|---|---|---|---|
| PESINC/ 14 DA-A2 | 3316 | 10.1 | 1125 | 46.8 | 3316$^\dagger$ + 1125$^\ddagger$ | 58.5 | 52.2 |

The fungicide composition was applied (first application) to *Solanum tuberosum* L. var. Bintje (the crop) on day one, after which top and bottom sides of leaves of the crop were infected with 5000 spores/ml of *Phytophthora infestans* at the time of one day after the first application, and after which the fungicide composition was applied a second time at 7 days after the first application.
Shown data are average values of f.e. observed for all leaves evaluated in multiple test trials, wherein in each test trial multiple potted potato plants were tested.
Synergistic effect of 'CP + CUP' is evaluated by comparison against the expected f.e. of the combination of the active compounds calculated according to the calculation method by Colby given above.
Tests were conducted on potted potato plants in Belgium. At fourteen days after the second application of fungicide composition (14 DA-A2), the degree of damage to the potato plants due to the Phytophthora infestans infection was assessed. In the assessment, the total amount of potato leaves and the amount of infected potato leaves was counted, with the number of leaves infected expressed as percentage (PESINC).
Even when the smallest lesion was observed, a leaf was counted as infected.
*DA-An = days after last application (with DA referring to "days after" and An referring to a specific application, n being a positive integer);
**a.c. = active compound Example 12

Example 12 concerns a fungicide composition comprising a combination of choline phosphonate and sulphur, which was applied on European grapevine (*Vitis vinifera* var. Carignan) infected with powdery mildew of grapevine (*Uncinula necator*), according to the test conditions mentioned above for Example 1. The results according to Example 12 are shown in Table 12.

TABLE 12

Test results of Example 12, showing fungicidal effect (f.e.) against *Uncinula necator* of a fungicide composition according to the first aspect of the present invention comprising choline phosphonate (CP) and sulphur (S), named 'CP + S', compared with fungicide compositions comprising CP or S individually.

| assessment protocol/ sample size (# of leaves or bunches)/ DA-An* | CP (g a.c.**/ha) | CP f.e. (%) | S (g a.c./ha) | S f.e. (%) | CP + S (g a.c. CP$^\dagger$/ha + g a.c. S$^\ddagger$/ha) | CP + S f.e. (%) | Colby f.e.(%) |
|---|---|---|---|---|---|---|---|
| PESSEV/100 leaves/ 14 DA-A3/BBCH 77 | 1740.9 | 15.9 | 2320 | 18.7 | 1728$^\dagger$ + 2304$^\ddagger$ | 40.2 | 31.6 |
| PESSEV/50 bunches/ 14 DA-A3/BBCH 77 | 1740.9 | 48.3 | 2320 | 50.8 | 1728$^\dagger$ + 2304$^\ddagger$ | 84.4 | 74.6 |
| PESSEV/50 bunches/ 14 DA-A5/BBCH 83 | 1740.9 | 12.8 | 2320 | 14.2 | 1728$^\dagger$ + 2304$^\ddagger$ | 50.9 | 25.2 |
| PESINC/100 leaves/ 14 DA-A3/BBCH 77 | 1740.9 | 34.1 | 2320 | 42.8 | 1728$^\dagger$ + 2304$^\ddagger$ | 80.7 | 62.3 |
| PESINC/50 bunches/ 14 DA-A3/BBCH 77 | 1740.9 | 3.8 | 2320 | 5.1 | 1728$^\dagger$ + 2304$^\ddagger$ | 29.9 | 8.7 |
| PESINC/50 bunches/ 14 DA-A5/BBCH 83 | 1740.9 | 38.6 | 2320 | 37.6 | 1728$^\dagger$ + 2304$^\ddagger$ | 69.2 | 61.7 |
| PESSEV/100 leaves/ 14 DA-A3/BBCH 77 | 1740.9 | 8.7 | 2320 | 13.9 | 1728$^\dagger$ + 2304$^\ddagger$ | 31.9 | 21.4 |

TABLE 12-continued

Test results of Example 12, showing fungicidal effect (f.e.) against *Uncinula necator* of a fungicide composition according to the first aspect of the present invention comprising choline phosphonate (CP) and sulphur (S), named 'CP + S', compared with fungicide compositions comprising CP or S individually.

| assessment protocol/ sample size (# of leaves or bunches)/ DA-An* | CP (g a.c.**/ha) | CP f.e. (%) | S (g a.c./ha) | S f.e. (%) | CP + S (g a.c. CP†/ha + g a.c. S‡/ha) | CP + S f.e. (%) | Colby f.e.(%) |
|---|---|---|---|---|---|---|---|
| PESSEV/50 bunches/ 14 DA-A3/BBCH 77 | 1740.9 | 4.0 | 2320 | 6.0 | 1728† + 2304‡ | 10.6 | 9.8 |
| PESSEV/50 bunches/ 14 DA-A5/BBCH 83 | 1740.9 | 17.4 | 2320 | 18.9 | 1200† + 120‡ | 40.1 | 33.0 |
| PESINC/100 leaves/ 14 DA-A3/BBCH 77 | 1740.9 | 6.7 | 2320 | 6.3 | 1728† + 2304‡ | 14.6 | 12.6 |
| PESINC/50 bunches/ 14 DA-A3/BBCH 77 | 1740.9 | 0.8 | 2320 | 1.2 | 1728† + 2304‡ | 8.7 | 2.0 |
| PESINC/50 bunches/ 14 DA-A5/BBCH 83 | 1740.9 | 0 | 2320 | 0 | 1728† + 2304‡ | 0.5 | 0 |

The fungicide composition was applied to *Vitis vinifera* var. Carignan (the crop) infected with *Uncinula necator*.
Shown data are average values of f.e. observed for 100 leaves of *Vitis vinifera* var. Carignan or 50 bunches of *Vitis vinifera* var. Carignan.
Fungicidal effect f.e. was evaluated according to two different assessment protocols: (i) 100 leaves per plot of uniform age, or the leaves of 50 bunches, were inspected both on upper and lower sides for infection with *Uncinula necator*, with the number of leaves infected expressed as percentage (PESINC), and (ii) 100 leaves per plot, or the leaves of 50 bunches, of uniform age were inspected both on upper and lower sides for infection with *Uncinula necator*, with the foliar surface of leaves infected expressed as percentage (PESSEV).
Synergistic effect of 'CP + S' is evaluated by comparison against the expected f.e. of the combination of the active compounds calculated according to the calculation method by Colby given above.
Tests were conducted in France and the crops were sprayed with multiple applications of the active compound preparations, according to the following scheme: A1 (first application), A2 = A1 + 10 days, A3 = A2 + 10 days, A4 = A3 + 8 days, A5 = A4 + 3 days, A6 = A5 + 7 days, A7 = A6 + 10 days, A8 = A7 + 7 days, A9 = A8 + 8 days, A10 = A9 + 10 days, and A11 = A10 + 10 days.
*DA-An = days after last application (with DA referring to "days after" and An referring to a specific application, n being a positive integer);
**a.c. = active compound

Example 13

Example 13 concerns a fungicide composition comprising a combination of choline phosphonate and sulphur, which was applied on apple (*Malus domestica* var. Gold Rush, and *Malus domestica* var. Morgenduft Dallago) crops infected with powdery mildew of apple (*Podosphaera leucotricha*), according to the test conditions mentioned above for Example 1. The results according to Example 13 are shown in Table 13.

TABLE 13

Test results of Example 13, showing fungicidal effect (f.e.) against *Podosphaera leucotricha* of a fungicide composition according to the first aspect of the present invention comprising choline phosphonate (CP) and sulphur (S), named 'CP + S', compared with fungicide compositions comprising CP or S individually.

| assessment protocol/ test location/ sample size (# of shoots or leaves)/ DA-An*/ growth stage of crop | CP (g a.c.**/ha) | CP f.e. (%) | S (g a.c./ha) | S f.e. (%) | CP + S (g a.c. CP†/ha + g a.c. S‡/ha) | CP + S f.e. (%) | Colby f.e. (%) |
|---|---|---|---|---|---|---|---|
| PESINC/location 1/ 20 shoots/7 DA-A5/ BBCH 71 | 1948.15 | 56.5 | 2640 | 80.0 | 1958.4† + 2611.2‡ | 96.5 | 91.3 |
| PESSEV/location 1/ 100 leaves/6 DA-A6/ BBCH 74 | 1948.15 | 53.1 | 2640 | 64.1 | 1958.4† + 2611.2‡ | 87.5 | 83.2 |
| PESINC/location 1/ 100 leaves/6 DA-A6/ BBCH 74 | 1948.15 | 44.2 | 2640 | 59.1 | 1958.4† + 2611.2‡ | 83.3 | 77.2 |

TABLE 13-continued

Test results of Example 13, showing fungicidal effect (f.e.) against *Podosphaera leucotricha*
of a fungicide composition according to the first aspect of the present invention
comprising choline phosphonate (CP) and sulphur (S), named 'CP + S',
compared with fungicide compositions comprising CP or S individually.

| assessment protocol/ test location/ sample size (# of shoots or leaves)/ DA-An*/ growth stage of crop | CP (g a.c.**/ha) | CP f.e. (%) | S (g a.c./ha) | S f.e. (%) | CP + S (g a.c. CP†/ha + g a.c. S‡/ha) | CP + S f.e. (%) | Colby f.e. (%) |
|---|---|---|---|---|---|---|---|
| PESINC/location 1/ 100 leaves/5 DA-A8/ BBCH 74 | 1948.15 | 34.0 | 2640 | 88.1 | 1958.4† + 2611.2‡ | 93.7 | 92.1 |
| PESSEV/location 1/ 100 leaves/15 DA-A8/ BBCH 76 | 1948.15 | 34.2 | 2640 | 88.2 | 1958.4† + 2611.2‡ | 96.2 | 92.3 |
| PESINC/location 1/ 100 leaves/15 DA-A8/ BBCH 76 | 1948.15 | 18.6 | 2640 | 80.7 | 1958.4† + 2611.2‡ | 93.7 | 84.3 |
| PESINC/location 2/ 40 shoots/6 DA-A5/ BBCH 71 | 1948.15 | 2.7 | 2640 | 57.8 | 1958.4† + 2611.2‡ | 79.4 | 58.9 |
| PESSEV/location 2/ 5 leaves/5 DA-A6/ BBCH 74 | 1948.15 | 30.4 | 2640 | 72.7 | 1958.4† + 2611.2‡ | 81.8 | 81.0 |
| PESINC/location 2/ 5 leaves/5 DA-A6/ BBCH 74 | 1948.15 | 23.6 | 2640 | 63.9 | 1958.4† + 2611.2‡ | 75.3 | 72.4 |
| PESINC/location 2/ 40 shoots/2 DA-A10/ BBCH 74 | 1948.15 | 19.3 | 2640 | 62.4 | 1958.4† + 2611.2‡ | 90.6 | 69.7 |
| PESSEV/location 2/ 5 leaves/2 DA-A10/ BBCH 74 | 1948.15 | 37.7 | 2640 | 82.1 | 1958.4† + 2611.2‡ | 96.4 | 88.8 |
| PESINC/location 2/ 40 shoots/6 DA-A11/ BBCH 74 | 1948.15 | 12.2 | 2640 | 59.4 | 1958.4† + 2611.2‡ | 80.2 | 64.4 |
| PESSEV/location 2/ 5 leaves/6 DA-A11/ BBCH 74 | 1948.15 | 14.1 | 2640 | 84.4 | 1958.4† + 2611.2‡ | 94.4 | 86.6 |

The fungicide composition was applied to *Malus domestica* var. Golden Rush and to *Malus domestica* var. Morgenduft Dallago (the crop) infected with *Podosphaera leucotricha*.

Tests were conducted in two different locations, being France and Italy, hereinafter referred to as locations 1 and 2, respectively.

For Italy, fungicide compositions were diluted with water to arrive at application volumes exceeding 1000 L/ha, and in particular ranging from 1000 to 1300 L/ha.

Fungicidal effect f.e. was evaluated according to two different assessment protocols: (i) specified amounts of leaves, or the leaves of a specified amount of shoots, per plot of uniform age were inspected both on upper and lower sides for infection with *Podosphaera leucotricha*, with the number of leaves infected expressed as percentage (PESINC), and (ii) specified amounts of leaves, or the leaves of a specified amount of shoots, per plot of uniform age were inspected both on upper and lower sides for infection with *Podosphaera leucotricha*, with the foliar surface of leaves infected expressed as percentage (PESSEV).

For each protocol, results were compared with respect to an untreated check.

Synergistic effect of 'CP + S' is evaluated by comparison against the expected f.e. of the combination of the individual active compounds calculated according to the calculation method by Colby given above.

Crops were sprayed with multiple applications of the active compound preparations, according to the following schemes for location 1: A1 (first application), A2 = A1 + 8 days, A3 = A2 + 8 days, and A4 = A3 + 8 days, A5 = A4 + 7 days, A6 = A5 + 7 days, A7 = A6 + 7 days, A8 = A7 + 7 days; and location 2: A1 (first application), A2 = A1 + 4 days, A3 = A2 + 6 days, and A4 = A3 + 7 days, A5 = A4 + 7 days, A6 = A5 + 6 days, A7 = A6 + 5 days, A8 = A7 + 6 days, A9 = A8 + 7 days, A10 = A9 + 7 days, A11 = A10 + 9 days.

*DA-An = days after last application (with DA referring to "days after" and An referring to a specific application, n being a positive integer);

**a.c. = active compound

Example 14

Example 14 concerns a fungicide composition comprising a combination of choline phosphonate and tagatose, which was applied on apple (*Malus domestica* var. Gold Rush, and *Malus domestica* var. Morgenduft Dallago) crops infected with powdery mildew of apple (*Podosphaera leucotricha*), according to the test conditions mentioned above for Example 1. The results according to Example 14 are shown in Table 14.

TABLE 14

Test results of Example 14, showing fungicidal effect (f.e.) against *Podosphaera leucotricha* of a fungicide composition according to the first aspect of the present invention comprising choline phosphonate (CP) and tagatose (TAG), named 'CP + TAG', compared with fungicide compositions comprising CP or TAG individually.

| assessment protocol/ test location/ sample size (# of shoots or leaves)/ DA-An*/ growth stage of crop | CP (g a.c.**/ha) | CP f.e. (%) | TAG (g a.c./ha) | TAG f.e. (%) | CP + TAG (g a.c. CP†/ha + g a.c. TAG‡/ha) | CP + TAG f.e. (%) | Colby f.e. (%) |
|---|---|---|---|---|---|---|---|
| PESINC/location 1/ 20 shoots/7 DA-A5/ BBCH 71 | 1948.15 | 56.5 | 840 | 26.7 | 1948.15† + 840‡ | 69.9 | 68.1 |
| PESSEV/location 1/ 100 leaves/6 DA-A6/ BBCH 74 | 1948.15 | 53.1 | 840 | 15.6 | 1948.15† + 840‡ | 62.5 | 60.5 |
| PESINC/location 1/ 100 leaves/6 DA-A6/ BBCH 74 | 1948.15 | 44.2 | 840 | 14.5 | 1948.15† + 840‡ | 59.2 | 52.3 |
| PESSEV/location 1/ 100 leaves/5 DA-A8/ BBCH 74 | 1948.15 | 62.5 | 840 | 38.4 | 1948.15† + 840‡ | 86.8 | 76.9 |
| PESINC/location 1/ 100 leaves/5 DA-A8/ BBCH 74 | 1948.15 | 34.0 | 840 | 18.8 | 1948.15† + 840‡ | 60.7 | 46.4 |
| PESSEV/location 1/ 100 leaves/15 DA-A8/ BBCH 76 | 1948.15 | 34.2 | 840 | 2.6 | 1948.15† + 840‡ | 60.2 | 35.9 |
| PESINC/location 1/ 100 leaves/15 DA-A8/ BBCH 76 | 1948.15 | 18.6 | 840 | 8.7 | 1948.15† + 840‡ | 45.9 | 25.7 |
| PESINC/location 1/ 20 shoots/7 DA-A5/ BBCH 71 | 1948.15 | 2.7 | 840 | 0.6 | 1948.15† + 840‡ | 25.2 | 3.3 |
| PESSEV/location 1/ 100 leaves/6 DA-A6/ BBCH 74 | 1948.15 | 30.4 | 840 | 44.9 | 1948.15† + 840‡ | 63.9 | 61.7 |
| PESINC/location 1/ 100 leaves/6 DA-A6/ BBCH 74 | 1948.15 | 23.6 | 840 | 36.4 | 1948.15† + 840‡ | 57.5 | 51.4 |
| PESSEV/location 1/ 100 leaves/5 DA-A8/ BBCH 74 | 1948.15 | 19.3 | 840 | 1.6 | 1948.15† + 840‡ | 43.5 | 20.6 |
| PESINC/location 1/ 100 leaves/5 DA-A8/ BBCH 74 | 1948.15 | 37.7 | 840 | 2.4 | 1948.15† + 840‡ | 63.6 | 39.2 |
| PESSEV/location 1/ 100 leaves/15 DA-A8/ BBCH 76 | 1948.15 | 12.2 | 840 | 3.5 | 1948.15† + 840‡ | 33.2 | 15.3 |
| PESINC/location 1/ 100 leaves/15 DA-A8/ BBCH 76 | 1948.15 | 14.1 | 840 | 5.9 | 1948.15† + 840‡ | 65.2 | 19.2 |

The fungicide composition was applied to *Malus domestica* var. Golden Rush and to *Malus domestica* var. Morgenduft Dallago (the crop) infected with *Podosphaera leucotricha*.
Tests were conducted in two different locations, being France and Italy, hereinafter referred to as locations 1 and 2, respectively. .
For Italy, fungicide compositions were diluted with water to arrive at application volumes exceeding 1000 L/ha, and in particular ranging from 1000 to 1300 L/ha.
Fungicidal effect f.e. was evaluated according to two different assessment protocols: (i) specified amounts of leaves, or the leaves of a specified amount of shoots, per plot of uniform age were inspected both on upper and lower sides for infection with *Podosphaera leucotricha*, with the number of leaves infected expressed as percentage (PESINC), and (ii) specified amounts of leaves, or the leaves of a specified amount of shoots, per plot of uniform age were inspected both on upper and lower sides for infection with *Podosphaera leucotricha*, with the foliar surface of leaves infected expressed as percentage (PESSEV).
For each protocol, results were compared with respect to an untreated check.
Synergistic effect of 'CP + TAG' is evaluated by comparison against the expected f.e. of the combination of the individual active compounds calculated according to the calculation method by Colby given above.

TABLE 14-continued

Test results of Example 14, showing fungicidal effect (f.e.) against *Podosphaera leucotricha* of a fungicide composition according to the first aspect of the present invention comprising choline phosphonate (CP) and tagatose (TAG), named 'CP + TAG', compared with fungicide compositions comprising CP or TAG individually.

| assessment protocol/ test location/ sample size (# of shoots or leaves)/ DA-An*/ growth stage of crop | CP (g a.c.**/ha) | CP f.e. (%) | TAG (g a.c./ha) | TAG f.e. (%) | CP + TAG (g a.c. CP†/ha + g a.c. TAG‡/ha) | CP + TAG f.e. (%) | Colby f.e. (%) |
|---|---|---|---|---|---|---|---|

Crops were sprayed with multiple applications of the active compound preparations, according to the following schemes for location 1: A1 (first application), A2 = A1 + 8 days, A3 = A2 + 8 days, and A4 = A3 + 8 days, A5 = A4 + 7 days, A6 = A5 + 7 days, A7 = A6 + 7 days, A8 = A7 + 7 days; and location 2: A1 (first application), A2 = A1 + 4 days, A3 = A2 + 6 days, and A4 = A3 + 7 days, A5 = A4 + 7 days, A6 = A5 + 6 days, A7 = A6 + 5 days, A8 = A7 + 6 days, A9 = A8 + 7 days, A10 = A9 + 7 days, A11 = A10 + 9 days.
*DA-An = days after last application (with DA referring to "days after" and An referring to a specific application, n being a positive integer);
**a.c. = active compound

Example 15

Example 15 concerns a fungicide composition comprising a combination of choline phosphonate and tagatose, which was applied on apple (*Malus domestica* var. Gala) crops infected with apple scab (*Venturia inaequalis*), according to the test conditions mentioned above for Example 1. The results according to Example 15 are shown in Table 15.

TABLE 15

Test results of Example 15, showing fungicidal effect (f.e.) against *Venturia inaequalis* of a fungicide composition according to the first aspect of the present invention comprising choline phosphonate (CP) and tagatose (TAG), named 'CP + TAG', compared with fungicide compositions comprising CP or TAG individually.

| assessment protocol/ sample size (# of leaves)/ DA-An*/ growth stage of crop | CP (g a.c.**/ha) | CP f.e. (%) | TAG (g a.c./ha) | TAG f.e. (%) | CP + TAG (g a.c. CP†/ha + g a.c. TAG‡/ha) | CP + TAG f.e. (%) | Colby f.e. (%) |
|---|---|---|---|---|---|---|---|
| PESINC/200 leaves/ 28 DA-A12/BBCH 73 | 3316 | 67.7 | 1200 | 28.1 | 3316† + 1200‡ | 81.6 | 76.8 |
| PESINC/200 leaves/ 56 DA-A12/BBCH 75 | 3316 | 65.3 | 1200 | 28.0 | 3316† + 1200‡ | 79.1 | 75.0 |

The fungicide composition was applied to *Malus domestica* var. Gala (the crop) infected with *Venturia inaequalis*.
Tests were conducted in France.
Fungicidal effect f.e. was evaluated according to two different assessment protocols: (i) 200 leaves per plot of uniform age were inspected both on upper and lower sides for infection with *Venturia inaequalis*, with the number of leaves infected expressed as percentage (PESINC), and (ii) 200 leaves per plot of uniform age were inspected both on upper and lower sides for infection with *Venturia inaequalis*, with the foliar surface of leaves infected expressed as percentage (PESSEV).
For each protocol, results were compared with respect to an untreated check.
Synergistic effect of 'CP + TAG' is evaluated by comparison against the expected f.e. of the combination of the individual active compounds calculated according to the calculation method by Colby given above.
Crops were sprayed with multiple applications of the active compound preparations, according to the following scheme: A1 (first application), A2 = A1 + 7 days, A3 = A2 + 6 days, and A4 = A3 + 3 days, A5 = A4 + 6 days, A6 = A5 + 6 days, A7 = A6 + 7 days, A8 = A7 + 3 days, A9 = A8 + 7 days, A10 = A9 + 7 days, A11 = A10 + 6 days, A12 = A11 + 4 days.
*DA-An = days after last application (with DA referring to "days after" and An referring to a specific application, n being a positive integer);
**a.c. = active compound

The invention claimed is:

1. A synergistically effective fungicide composition comprising as component (A) a fungicidally active amount of choline phosphonate and as component (B) at least one additional fungicide selected from the group consisting of dithianon, isofetamid, zoxamid, fluopicolide, sulphur, valifenalate and tagatose, wherein a weight ratio of components (A) and (B) is in a range from 1:150 to 150:1.

2. The fungicide composition according to claim 1, wherein the fungicide composition comprises as component (A) a fungicidally active amount of choline phosphonate and as component (B) dithianon, wherein a weight ratio of components (A) and (B) is in a range from 2:1 to 32:1.

3. The fungicide composition according to claim 1, wherein the fungicide composition comprises as component (A) a fungicidally active amount of choline phosphonate and as component (B) isofetamid wherein a weight ratio of components (A) and (B) is in a range from 5:1 to 120:1.

4. The fungicide composition according to claim 1, wherein the fungicide composition comprises as component (A) a fungicidally active amount of choline phosphonate and as component (B) zoxamid wherein a weight ratio of components (A) and (B) is in a range from 6:1 to 100:1.

5. The fungicide composition according to claim 1, wherein the fungicide composition comprises as component (A) a fungicidally active amount of choline phosphonate and as component (B) fluopicolid wherein a weight ratio of components (A) and (B) is in a range from 6:1 to 100:1.

6. The fungicide composition according to claim 1, wherein the fungicide composition comprises as component (A) a fungicidally active amount of choline phosphonate and as component (B) sulphur wherein a weight ratio of components (A) and (B) is in a range from 1:8 to 1:1.

7. The fungicide composition according to claim 1, wherein the fungicide composition comprises as component (A) a fungicidally active amount of choline phosphonate and as component (B) valifenalate wherein a weight ratio of components (A) and (B) is in a range from 2.5:1 to 40:1.

8. The fungicide composition according to claim 1, wherein the fungicide composition comprises as component (A) a fungicidally active amount of choline phosphonate and as component (B) tagatose wherein a weight ratio of components (A) and (B) is in a range from 1:5 to 4:1.

9. The fungicide composition according to claim 1, further comprising one or more additional components selected from the group comprising other fungicides, other pesticides such as herbicides, insecticides, or other active pesticide ingredients, safeners, antioxidants, chemical stabilizers, adhesives, fertilizers, perfumes, colorants, liquid carriers, solid carriers, surface-active agents, crystallisation inhibitors, viscosity modifiers, suspending agents, spray droplet modifiers, pigments, foaming agents, light-blocking agents, compatibility agents, antifoam agents, sequestering agents, neutralising agents and buffers, wetting and dispersing agents, preservatives, thickening agents, corrosion inhibitors, freezing point depressants, odorants, spreading agents, penetration aids, micronutrients, emollients, lubricants, sticking agents and humectants.

10. A kit comprising one or more spatially separated components to be used as a fungicide composition, comprising as component (A) a fungicidally active amount of choline phosphonate and as component (B) at least one additional fungicide selected from the group consisting of dithianon, isofetamid, zoxamid, fluopicolide, sulphur, valifenalate and tagatose, wherein a weight ratio of components (A) and (B) is in a range from 1:150 to 150:1.

11. A method comprising using the fungicide composition according to claim 1 in an amount effective for controlling one or more types of fungal infections by applying the fungicide composition to the fungal infections.

12. The method according to claim 11, wherein said a fungicide composition is effective for controlling one or more types of fungal infections on a crop, seeds and soil.

13. The synergistically effective fungicide composition according to claim 1,
wherein component (B) comprises at least one additional fungicide, said additional fungicide being any one of:
dithianon, wherein a weight ratio of components (A) and (B) is in a range from 2:1 to 32:1,
isofetamid wherein a weight ratio of components (A) and (B) is in a range from 5:1 to 120:1,
zoxamid wherein a weight ratio of components (A) and (B) is in a range from 6:1 to 100:1,
fluopicolid wherein a weight ratio of components (A) and (B) is in a range from 6:1 to 100:1,
sulphur wherein a weight ratio of components (A) and (B) is in a range from 1:8 to 1:1,
valifenalate wherein a weight ratio of components (A) and (B) is in a range from 2.5:1 to 40:1,
tagatose wherein a weight ratio of components (A) and (B) is in a range from 1:5 to 4:1, or
cuprous oxide, wherein a weight ratio of components (A) and (B) is in a range from 1:5 to 10:1.

14. The method of claim 12, further comprising applying the fungicide composition simultaneously or in sequential use so that the fungicide composition is readily translocated as such in a plant, rendering tissues penetrated of said plant toxic to fungi.

15. The method of claim 14, wherein applying the fungicide composition simultaneously comprises mixing component A and component B in a spray tank to form a spray liquor prior to applying the fungicide composition.

16. The method of claim 12, further comprising applying the fungicide composition simultaneously or in sequential use.

* * * * *